US012418825B2

(12) United States Patent
Xu et al.

(10) Patent No.: US 12,418,825 B2
(45) Date of Patent: Sep. 16, 2025

(54) COMMUNICATION METHOD AND APPARATUS

(71) Applicant: HUAWEI TECHNOLOGIES CO., LTD., Guangdong (CN)

(72) Inventors: Shengfeng Xu, Beijing (CN); Meng Li, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 17/974,282

(22) Filed: Oct. 26, 2022

(65) Prior Publication Data

US 2023/0046157 A1 Feb. 16, 2023

Related U.S. Application Data

(63) Continuation of application No. PCT/CN2021/089805, filed on Apr. 26, 2021.

(30) Foreign Application Priority Data

Apr. 28, 2020 (CN) .......................... 202010349874.3

(51) Int. Cl.
H04W 28/02 (2009.01)
H04W 48/16 (2009.01)
H04W 88/04 (2009.01)

(52) U.S. Cl.
CPC ....... *H04W 28/0268* (2013.01); *H04W 48/16* (2013.01); *H04W 88/04* (2013.01)

(58) Field of Classification Search
None
See application file for complete search history.

(56) References Cited

U.S. PATENT DOCUMENTS 10,433,203 B1 * 10/2019 Kothari ................ H04W 16/32
12,207,139 B2 * 1/2025 Deng .................. H04W 72/543
(Continued)

FOREIGN PATENT DOCUMENTS

CN 106162512 A 11/2016
CN 108366355 A 8/2018
(Continued)

OTHER PUBLICATIONS

Office Action in Chinese Appln. No. 202010349874.3, dated May 19, 2023, 10 pages.
(Continued)

*Primary Examiner* — Brian S Roberts
(74) *Attorney, Agent, or Firm* — Fish & Richardson P.C.

(57) ABSTRACT

This application provides a communication method and apparatus. One example method comprises: obtaining, by a first communication apparatus, a first service that is to be sent from the first communication apparatus to a second communication apparatus; determining, by the first communication apparatus, a second quality of service (QoS) parameter based on the first service, wherein the second QoS parameter indicates a QoS requirement for sending the first service from the first communication apparatus to the second communication apparatus; sending, by the first communication apparatus, the second QoS parameter to a first relay communication apparatus, wherein the first relay communication apparatus is a relay communication apparatus between the first communication apparatus and the second communication apparatus; and receiving, by the first communication apparatus, a third QoS parameter from the first relay communication apparatus, wherein the third QoS parameter is used to determine a QoS parameter corresponding to the first service on a first link, and the first link is a (Continued)

link between the first communication apparatus and the first relay communication apparatus.

18 Claims, 16 Drawing Sheets

(56) References Cited

U.S. PATENT DOCUMENTS

| | | | |
|---|---|---|---|
| 2012/0127883 A1* | 5/2012 | Chang | H04B 7/155 370/252 |
| 2016/0286437 A1 | 9/2016 | Enomoto et al. | |
| 2018/0027475 A1 | 1/2018 | Li et al. | |
| 2018/0054237 A1 | 2/2018 | Tseng et al. | |
| 2018/0092139 A1* | 3/2018 | Novlan | H04B 7/2606 |
| 2018/0124633 A1 | 5/2018 | Hwang et al. | |
| 2019/0053262 A1* | 2/2019 | Zeng | H04L 5/0044 |
| 2020/0084656 A1 | 3/2020 | Nguyen et al. | |
| 2024/0039618 A1* | 2/2024 | Tekgul | H04W 24/02 |

FOREIGN PATENT DOCUMENTS

| | | |
|---|---|---|
| CN | 108616926 A | 10/2018 |
| CN | 109479189 A | 3/2019 |
| CN | 110268787 A | 9/2019 |
| CN | 110602801 A | 12/2019 |
| CN | 110831075 A | 2/2020 |
| EP | 4142369 A1 | 3/2023 |
| WO | 2018085568 A1 | 5/2018 |

OTHER PUBLICATIONS

Catt, "Solution to support UE-to-UE Relay," 3GPP TSG-SA WG2 Meeting #136AH, S2-2000808, Incheon, Korea, Jan. 13-17, 2020, 3 pages.
InterDigital Inc., "Further Details on Link Establishment Procedure," 3GPP RAN WG2 Meeting #105, R2-1901580, Athens, Greece, Feb. 25-Mar. 1, 2019, 4 pages.
Huawei et al., "KI#4, S01#31: Update for L2 UE-to-UE Relay," 3GPP TSG-WG SA2 Meeting #140E e-meeting, S2-2005642, Elbonia, Aug. 19-Sep. 1, 2020, 3 pages.
Extended European Search Report in European Appln No. 21795702.6, dated Aug. 17, 2023, 10 pages.
Huawei, "Key Points on Sidelink Relay SID," 3GPP TSG RAN Meeting #86, RP-192791, Sitges, Spain, Dec. 9-12, 2019, 7 pages.
Catt, "Considerations about ProSe UE-UE Relays, " SA WG2 Meeting #104, Jul. 7-11, 2014, S2-142594, Dublin, Ireland, 3 pages.
SA WG2, "New SID: Study on System Enhancement for Proximity Based Services in 5GS," TSG SA Meeting #SP-83, SP-190186, Mar. 20-22, 2019, Shenzhen, China, 4 pages.
Catt, "PC5 QoS Handling for Network Scheduled Operation Mode," 3GPP TSG-SA WG2 Meeting #136AH, Jan. 13-17, 2020, S2-2000979, Incheon, South Korea, 3 pages.
3GPP TS 23.401 V16.6.0, "3rd Generation Partnership Project; Technical Specification Group Services and System Aspects; General Packet Radio Service (GPRS) Enhancements for Evolved Universal Terrestrial Radio Access Network (E-UTRAN) Access (Release 16)," Mar. 2020, 436 pages.
3GPP TS 23.287 V16.2.0, "3rd Generation Partnership Project; Technical Specification Group Services and System Aspects; Architecture Enhancements for 5G System (5GS) to Support Vehicle-to-Everything (V2X) Services (Release 16)," Mar. 2020, 53 pages.
3GPP TS 38.331 V16.0.0, "3rd Generation Partnership Project; Technical Specification Group Radio Access Network; NR; Radio Resource Control (RRC) Protocol Specification (Release 16)," Mar. 2020, 835 pages.
3GPP TS 36.331 V16.0.0, "3rd Generation Partnership Project; Technical Specification Group Radio Access Network; Evolved Universal Terrestrial Radio Access (E-UTRA); Radio Resource Control (RRC); Protocol Specification (Release 16)," Mar. 2020, 1048 pages.
3GPP TR 23.752 V0.3.0, "3rd Generation Partnership Project; Technical Specification Group Services and System Aspects; Study on System Enhancement for Proximity Based Services (ProSe) in the 5G System (5GS) (Release 17)," Jan. 2020, 73 pages.
Office Action in Chinese Appln. No. 202010349874.3, dated Jan. 5, 2023, 15 pages.
International Search Report and Written Opinion in International Appln. No. PCT/CN2021/089805, mailed on Jul. 28, 2021, 17 pages (with English translation).

* cited by examiner

FIG. 9B

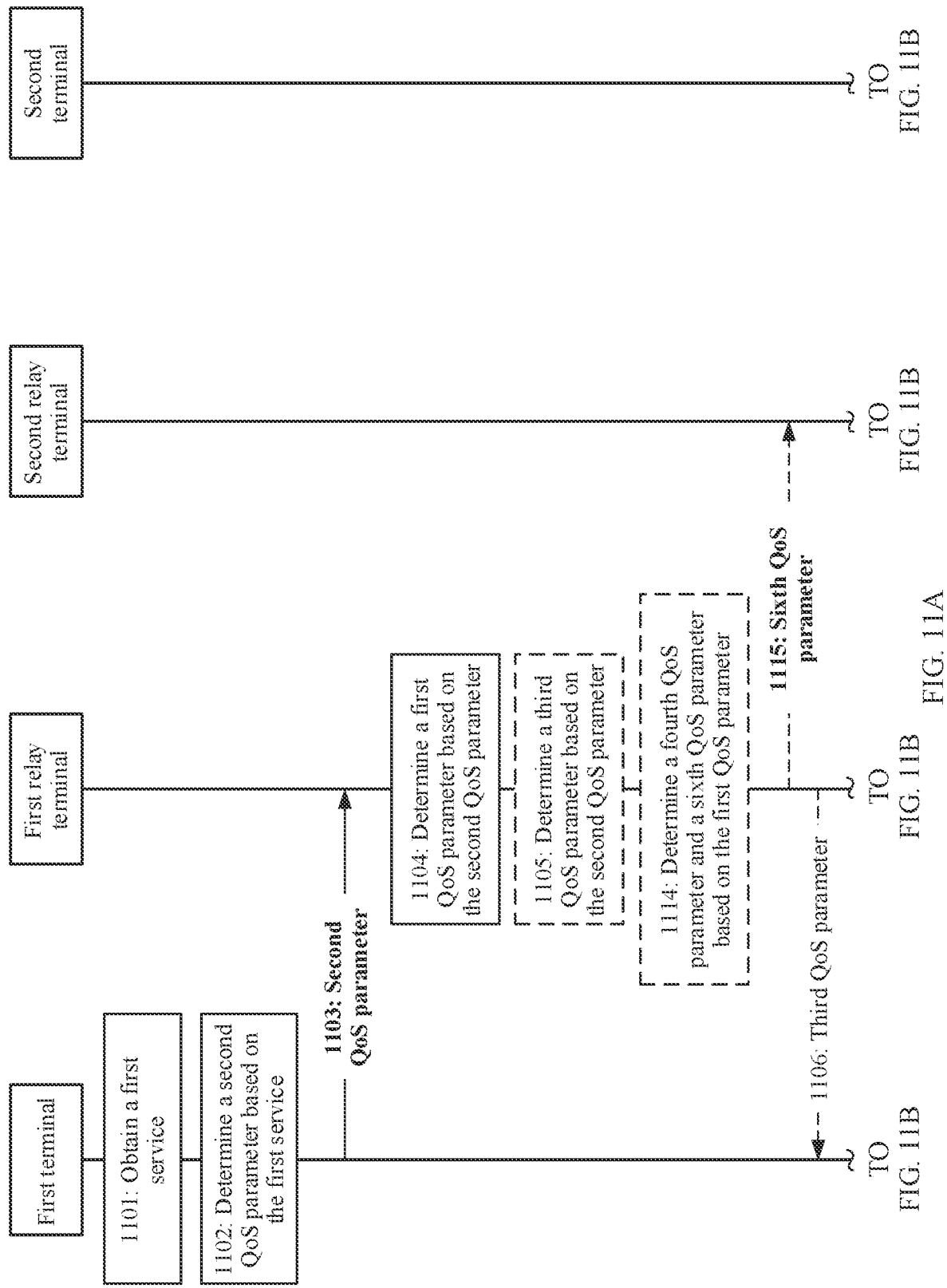

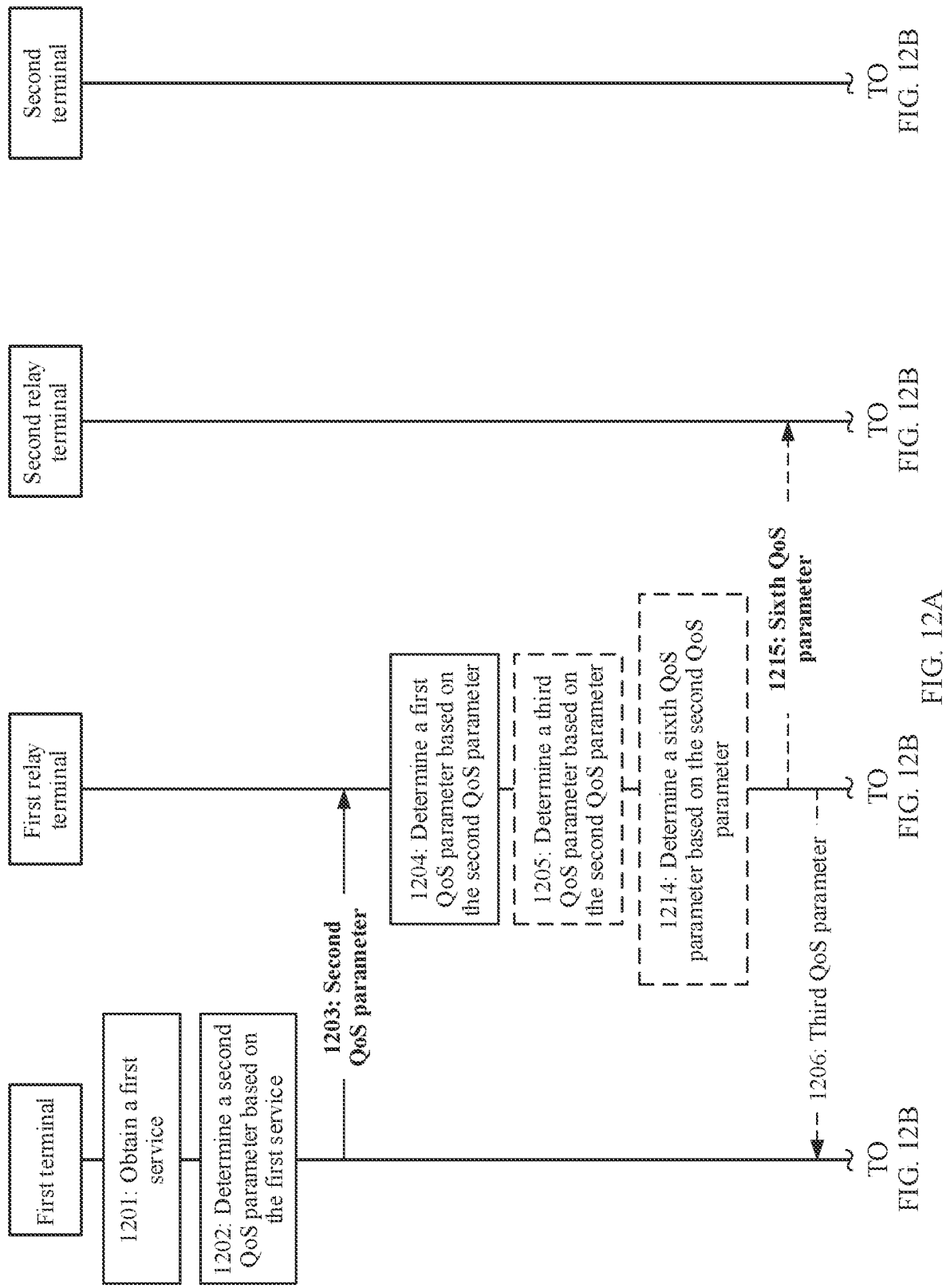

COMMUNICATION METHOD AND APPARATUS

CROSS-REFERENCE TO RELATED APPLICATIONS

This application is a continuation of International Application No. PCT/CN2021/089805, filed on Apr. 26, 2021, which claims priority to Chinese Patent Application No. 202010349874.3, filed on Apr. 28, 2020. The disclosures of the aforementioned applications are hereby incorporated by reference in their entireties.

TECHNICAL FIELD

This application relates to the communications field, and more specifically, to a communication method and apparatus.

BACKGROUND

With rapid development of mobile communication, universal use of new service types, for example, data services such as video chat and virtual reality (virtual reality, VR)/augmented reality (augmented reality, AR), increases a bandwidth requirement of a user. Device-to-device (device-to-device, D2D) communication allows direct communication between terminals, and the terminals may share spectrum resources with cell users under control of a cell network, so that utilization of the spectrum resources is effectively improved. When a distance between a source terminal and a target terminal that perform D2D communication is large, assistance may be performed by using a relay terminal (relay UE).

In a communication scenario in which the relay terminal exists, a current technical solution relates only to link mapping (link mapping), to be specific, how the relay terminal generates and stores a correspondence between a link between the source terminal and the relay terminal and a link between the relay terminal and the target terminal, and does not consider management of another aspect such as quality of service (quality of service, QoS).

SUMMARY

This application provides a communication method and apparatus, to consider a QoS requirement of a service in a relay scenario.

According to a first aspect, this application provides a communication method. The method includes: A first terminal obtains a first service, where a target terminal of the first service is a second terminal. The first terminal determines a first quality of service QoS parameter based on the first service, where the first QoS parameter corresponds to a link included between a first relay terminal and the second terminal, and the first relay terminal is a relay terminal between the first terminal and the second terminal. The first terminal sends the first QoS parameter to the first relay terminal.

In the foregoing technical solution, the first terminal allocates the QoS parameter to the link between the first relay terminal and the second terminal based on the first service, so that a QoS requirement of the service can be considered in a relay scenario. This helps implement end-to-end QoS guarantee.

A target terminal of the first service is the second terminal. In other words, the first service is a service sent by the first terminal to the second terminal. Optionally, the first terminal obtains the first service from an application layer. The first service is not specifically limited in this embodiment of this application, and the first service may be any service that needs to be sent by the first terminal.

The first QoS parameter is used to determine a QoS parameter corresponding to the first service on a second link. In other words, the first QoS parameter is used to determine the QoS parameter corresponding to the first service when the first service is transmitted on the second link.

Optionally, information about the first service may include a service type and/or a service requirement. The service type may be a video service, a data service, a voice service, or the like. The service requirement may be a service priority requirement, a service reliability requirement, a service delay requirement, or the like.

Optionally, each QoS parameter in this application may include at least one of the following: a PQI (PC5 5QI), a flow bit rate (flow bit rate), or a link aggregated bit rate (link aggregated bit rate). The PQI is a special 5QI, and each PQI value is in a one-to-one correspondence with a PC5 QoS characteristic (PC5 QoS characteristic). The PC5 QoS characteristic may include one or more of the following: a resource type (resource type), a priority level (priority level), a data packet delay budget (packet delay budget), a data packet error rate (packet error rate), a maximum data burst volume (maximum data burst volume), an averaging window (averaging window), or the like. The resource type includes a GBR, a non-GBR, and the like. The averaging window may be used to calculate a rate corresponding to the GBR, and the data packet delay budget may refer to a delay of a data packet from a terminal A to a terminal B. The flow bit rate includes a guaranteed flow bit rate (guaranteed flow bit rate, GFBR) and a maximum flow bit rate (maximum flow bit rate, MFBR).

Optionally, the first terminal may allocate a QoS parameter to each link, so that all links as a whole can meet the QoS requirement of the first service. In this case, the first QoS parameter corresponds to the second link.

Optionally, the first terminal may divide the QoS requirement of the first service into two parts, where a first part is allocated to the first link, and a second part is allocated to all subsequent links and is indicated to the first relay terminal. The first relay terminal then further divides the second part of the QoS requirement into two parts, where a first part is allocated to the second link, and a second part is allocated to all subsequent links. The rest may be deduced by analogy. In this case, the first QoS parameter corresponds to all links between the first relay terminal and the second terminal.

With reference to the first aspect, in a possible implementation, that the first terminal determines a first quality of service QoS parameter based on the first service includes: The first terminal determines a second QoS parameter based on the first service, where the second QoS parameter indicates a QoS requirement of the first service that is sent by the first terminal to the second terminal. The first terminal determines the first QoS parameter based on the second QoS parameter.

In the foregoing technical solution, the first terminal may determine an end-to-end QoS requirement between the first terminal and the second terminal based on the first service, and then further determine a QoS requirement of a link between the first relay terminal and the second terminal, so that the QoS requirement of the service can be considered in the relay scenario. This helps implement end-to-end QoS guarantee.

With reference to the first aspect and any one of the foregoing possible implementations, in another possible implementation, the method further includes: The first terminal determines a third QoS parameter, where the third QoS parameter is used to determine a QoS parameter corresponding to the first service on a first link, and the first link is a link between the first terminal and the first relay terminal.

The third QoS parameter is used to determine the QoS parameter corresponding to the first service on the first link. In other words, the third QoS parameter is used to determine the QoS parameter corresponding to the first service when the first service is transmitted on the first link.

In the foregoing technical solution, the first terminal determines the QoS parameter of the link between the first terminal and the first relay terminal. In other words, the first terminal allocates a QoS parameter to each link, so that all links as a whole can meet the QoS requirement of the first service. This implements end-to-end QoS guarantee.

With reference to the first aspect and any one of the foregoing possible implementations, in another possible implementation, the method further includes: The first terminal determines an access stratum configuration of the first link based on the third QoS parameter. The first terminal sends the access stratum configuration of the first link to the first relay terminal. The first terminal sends the first service to the first relay terminal based on the access stratum configuration of the first link.

In the foregoing technical solution, the first terminal determines the access stratum configuration of the first link based on the third QoS parameter, and sends the access stratum configuration of the first link to the first relay terminal. In this way, the first relay terminal may map the access stratum configuration of the first link to an access stratum configuration for forwarding the first service. When receiving data that corresponds to the first service and that is sent by the first terminal on the access stratum configuration of the first link, the first relay terminal may determine the access stratum configuration for forwarding the data, to correctly forward the data corresponding to the first service.

With reference to the first aspect and any one of the foregoing possible implementations, in another possible implementation, that the first terminal determines a third QoS parameter includes: The first terminal determines the third QoS parameter based on the first service.

With reference to the first aspect and any one of the foregoing possible implementations, in another possible implementation, that the first terminal determines a third QoS parameter includes: The first terminal receives a fourth QoS parameter from the first relay terminal, where the fourth QoS parameter is a QoS parameter corresponding to the first service on a second link, the second link is a link between the first relay terminal and the second terminal or a link between the first relay terminal and a second relay terminal, and the second relay terminal is a relay terminal between the first relay terminal and the second terminal. The first terminal determines the third QoS parameter based on the second QoS parameter and the fourth QoS parameter.

The fourth QoS parameter is the QoS parameter corresponding to the first service on the second link. In other words, the fourth QoS parameter is the QoS parameter corresponding to the first service when the first service is transmitted on the second link.

In the foregoing technical solution, the first terminal determines the third QoS parameter based on an end-to-end QoS requirement of the first service and the QoS parameter that corresponds to the second link and that is determined by the first relay terminal. In other words, when the third QoS parameter is determined, both the QoS requirement of the first service and the QoS requirement that can be met by all links are considered as a whole. QoS allocation is performed in the foregoing manner, so that the QoS requirement allocated to the first link can be more appropriate.

With reference to the first aspect and any one of the foregoing possible implementations, in another possible implementation, that the first terminal determines an access stratum configuration of the first link based on the third QoS parameter includes: The first terminal receives a fourth QoS parameter from the first relay terminal, where the fourth QoS parameter is a QoS parameter corresponding to the first service on a second link, the second link is a link between the first relay terminal and the second terminal or a link between the first relay terminal and a second relay terminal, and the second relay terminal is a relay terminal between the first relay terminal and the second terminal. The first terminal determines a fifth QoS parameter based on the fourth QoS parameter and the third QoS parameter. The first terminal determines the access stratum configuration of the first link based on the fifth QoS parameter.

The fifth QoS parameter is a QoS parameter corresponding to the first service on the first link. In other words, the fifth QoS parameter is the QoS parameter corresponding to the first service when the first service is transmitted on the first link.

In the foregoing technical solution, the first terminal may determine the third QoS parameter based on the QoS parameter that corresponds to the second link and that is fed back by the first relay terminal, so that the QoS requirement allocated to the first link can be more appropriate.

With reference to the first aspect and any one of the foregoing possible implementations, in another possible implementation, that the first terminal determines a first quality of service QoS parameter based on the first service includes: The first terminal determines the first QoS parameter based on the first service and link information, where the link information indicates a link that needs to be used by the first terminal to send the first service to the second terminal.

In the foregoing technical solution, the first terminal allocates the QoS requirement of the first service based on the link information between the first terminal and the second terminal, for example, a quantity of links, so that all links as a whole meet the QoS requirement of the first service. This implements end-to-end QoS guarantee.

With reference to the first aspect and any one of the foregoing possible implementations, in another possible implementation, the method further includes: The first terminal determines a sixth QoS parameter based on the first service, where the sixth QoS parameter is used to determine a QoS parameter corresponding to the first service on a third link, the third link is a link between the second relay terminal and the second terminal or a link between the second relay terminal and a third relay terminal, the second relay terminal is a relay terminal between the first relay terminal and the second terminal, and the third relay terminal is a relay terminal between the second relay terminal and the second terminal. The first terminal sends the sixth QoS parameter to the first relay terminal.

The sixth QoS parameter is used to determine the QoS parameter corresponding to the first service on the third link. In other words, the sixth QoS parameter is used to determine the QoS parameter corresponding to the first service when the first service is transmitted on the third link.

When there are a plurality of relay terminals between the first terminal and the second terminal, by using the foregoing technical solution, the first terminal may determine a QoS parameter of each link, and forward the QoS parameter to each relay terminal by using the first relay terminal.

It should be noted that if necessary (for example, there is another relay terminal between the second relay terminal and the second terminal), the second relay terminal may alternatively perform processing similar to that of the first relay terminal.

According to a second aspect, this application provides a communication method. The method includes: A first relay terminal receives a first quality of service QoS parameter from a first terminal, where the first QoS parameter corresponds to a link included between the first relay terminal and a second terminal, the first relay terminal is a relay terminal between the first terminal and the second terminal, and the second terminal is a target terminal of a first service. The first relay terminal determines an access stratum configuration of a second link based on the first QoS parameter, where the second link is a link between the first relay terminal and the second terminal or a link between the first relay terminal and a second relay terminal, and the second relay terminal is a relay terminal between the first relay terminal and the second terminal. The first relay terminal receives an access stratum configuration of a first link from the first terminal, where the first link is a link between the first terminal and the first relay terminal, and the access stratum configuration of the first link corresponds to the access stratum configuration of the second link. The first relay terminal receives the first service from the first terminal based on the access stratum configuration of the first link, and forwards the first service based on the access stratum configuration of the second link.

In the foregoing technical solution, the first terminal allocates the QoS parameter to the link between the first relay terminal and the second terminal based on the first service, so that a QoS requirement of the service can be considered in a relay scenario. This helps implement end-to-end QoS guarantee.

The first QoS parameter is used to determine a QoS parameter corresponding to the first service on a second link. In other words, the first QoS parameter is used to determine the QoS parameter corresponding to the first service when the first service is transmitted on the second link.

Optionally, information about the first service may include a service type and/or a service requirement. The service type may be a video service, a data service, a voice service, or the like. The service requirement may be a service priority requirement, a service reliability requirement, a service delay requirement, or the like.

Optionally, each QoS parameter in this application may include at least one of the following: a PQI, a flow bit rate, or a link aggregated bit rate. The PQI is a special 5QI, and each PQI value is in a one-to-one correspondence with a PC5 QoS characteristic. The PC5 QoS characteristic may include one or more of the following: a resource type, a priority level, a data packet delay budget, a data packet error rate, a maximum data burst volume, an averaging window, or the like. The resource type includes a GBR, a non-GBR, and the like. The averaging window may be used to calculate a rate corresponding to the GBR, and the data packet delay budget may refer to a delay of a data packet from a terminal A to a terminal B. The flow bit rate includes a guaranteed flow bit rate and a maximum flow bit rate.

Optionally, when the first terminal may allocate a QoS parameter to each link, the first QoS parameter corresponds to the second link.

Optionally, when the first terminal may divide the QoS requirement of the first service into two parts, a first part is allocated to the first link, and a second part is allocated to all subsequent links and is indicated to the first relay terminal, the first QoS parameter corresponds to all links between the first relay terminal and the second terminal.

With reference to the first aspect and any one of the foregoing possible implementations, in another possible implementation, that the first relay terminal determines an access stratum configuration of a second link based on the first QoS parameter includes: The first relay terminal determines a fourth QoS parameter based on the first QoS parameter, where the fourth QoS parameter is a QoS parameter corresponding to the first service on the second link. The first relay terminal determines the access stratum configuration of the second link based on the fourth QoS parameter.

The fourth QoS parameter is the QoS parameter corresponding to the first service on the second link. In other words, the fourth QoS parameter is the QoS parameter corresponding to the first service when the first service is transmitted on the second link.

Optionally, the first relay terminal may determine whether the second link can meet the QoS requirement indicated by the first QoS parameter. When the second link can meet the QoS requirement indicated by the first QoS parameter, the first relay terminal determines the access stratum configuration of the second link based on the first QoS parameter. When the second link does not meet the QoS requirement indicated by the first QoS parameter, the first relay terminal may determine the fourth QoS parameter based on the first QoS parameter, where the fourth QoS parameter is the QoS parameter corresponding to the first service on the second link, and the first relay terminal determines the access stratum configuration of the second link based on the fourth QoS parameter.

According to the foregoing technical solution, the first relay terminal may determine, based on an actual status of the second link, the QoS parameter that can be met by the second link.

With reference to the first aspect and any one of the foregoing possible implementations, in another possible implementation, the method further includes: The first relay terminal sends the fourth QoS parameter to the first terminal.

In the foregoing technical solution, the first relay terminal feeds back the fourth QoS parameter to the first terminal, so that the first terminal may determine the QoS parameter of the link between the first terminal and the first relay terminal based on the fourth QoS parameter, and the QoS requirement allocated to the first link can be more appropriate.

With reference to the first aspect and any one of the foregoing possible implementations, in another possible implementation, the method further includes: The first relay terminal receives a sixth QoS parameter from the first terminal, or determining, by the first relay terminal, a sixth QoS parameter based on the first QoS parameter, where the sixth QoS parameter is used to determine a QoS parameter corresponding to the first service on a third link, the third link is a link between the second relay terminal and the second terminal or a link between the second relay terminal and a third relay terminal, and the third relay terminal is a relay terminal between the second relay terminal and the second terminal. The first relay terminal sends the sixth QoS parameter to the second relay terminal.

The sixth QoS parameter is used to determine the QoS parameter corresponding to the first service on the third link. In other words, the sixth QoS parameter is used to determine the QoS parameter corresponding to the first service when the first service is transmitted on the third link.

When there are a plurality of relay terminals between the first terminal and the second terminal, by using the foregoing technical solution, a QoS parameter of each link may be determined and forwarded to each relay terminal.

It should be noted that if necessary (for example, there is another relay terminal between the second relay terminal and the second terminal), the second relay terminal may alternatively perform processing similar to that of the first relay terminal.

According to a third aspect, this application provides a communication method. The method includes: A first terminal obtains a first service, where a target terminal of the first service is a second terminal. The first terminal determines a second quality of service QoS parameter based on the first service, where the second QoS parameter indicates a QoS requirement of the first service that is sent by the first terminal to the second terminal. The first terminal sends the second QoS parameter to a first relay terminal, where the first relay terminal is a relay terminal between the first terminal and the second terminal. The first terminal receives a third QoS parameter from the first relay terminal, where the third QoS parameter is used to determine a QoS parameter corresponding to the first service on a first link, and the first link is a link between the first terminal and the first relay terminal.

In the foregoing technical solution, the first terminal indicates an end-to-end QoS requirement of the first service to the first relay terminal, and the first relay terminal then allocates a QoS parameter to a link between the first relay terminal and the second terminal, so that the QoS requirement of the service can be considered in a relay scenario. This helps implement end-to-end QoS guarantee.

A target terminal of the first service is the second terminal. In other words, the first service is a service sent by the first terminal to the second terminal. Optionally, the first terminal obtains the first service from an application layer. The first service is not specifically limited in this embodiment of this application, and the first service may be any service that needs to be sent by the first terminal.

Optionally, information about the first service may include a service type and/or a service requirement. The service type may be a video service, a data service, a voice service, or the like. The service requirement may be a service priority requirement, a service reliability requirement, a service delay requirement, or the like.

The third QoS parameter is used to determine the QoS parameter corresponding to the first service on the first link. In other words, the third QoS parameter is used to determine the QoS parameter corresponding to the first service when the first service is transmitted on the first link.

Optionally, each QoS parameter in this application may include at least one of the following, a PQI, a flow bit rate, or a link aggregated bit rate. The PQI is a special 5QI, and each PQI value is in a one-to-one correspondence with a PC5 QoS characteristic. The PC5 QoS characteristic may include one or more of the following: a resource type, a priority level, a data packet delay budget, a data packet error rate, a maximum data burst volume, an averaging window, or the like. The resource type includes a GBR, a non-GBR, and the like. The averaging window may be used to calculate a rate corresponding to the GBR, and the data packet delay budget may refer to a delay of a data packet from a terminal A to a terminal B. The flow bit rate includes a guaranteed flow bit rate and a maximum flow bit rate.

With reference to the third aspect, in a possible implementation, the method further includes: The first terminal determines an access stratum configuration of the first link based on the third QoS parameter. The first terminal sends the access stratum configuration of the first link to the first relay terminal. The first terminal sends the first service to the first relay terminal based on the access stratum configuration of the first link.

In the foregoing technical solution, the first terminal determines the access stratum configuration of the first link based on the third QoS parameter, and sends the access stratum configuration of the first link to the first relay terminal. In this way, the first relay terminal may map the access stratum configuration of the first link to an access stratum configuration for forwarding the first service. When receiving data that corresponds to the first service and that is sent by the first terminal on the access stratum configuration of the first link, the first relay terminal may determine the access stratum configuration for forwarding the data, to correctly forward the data corresponding to the first service.

With reference to the third aspect and any one of the foregoing possible implementations, in another possible implementation, that the first terminal determines an access stratum configuration of the first link based on the third QoS parameter includes: The first terminal determines a fifth QoS parameter based on the third QoS parameter, where the fifth QoS parameter is a QoS parameter corresponding to the first service on the first link. The first terminal determines the access stratum configuration of the first link based on the fifth QoS parameter.

The fifth QoS parameter is a QoS parameter corresponding to the first service on the first link. In other words, the fifth QoS parameter is the QoS parameter corresponding to the first service when the first service is transmitted on the first link.

According to the foregoing technical solution, the first terminal may determine, based on an actual status of the first link, the QoS parameter that can be met by the first link.

With reference to the third aspect and any one of the foregoing possible implementations, in another possible implementation, the method further includes: The first terminal sends the fifth QoS parameter to the first relay terminal.

In the foregoing technical solution, the first terminal feeds back the fifth QoS parameter to the first terminal, so that the first relay terminal may determine the QoS parameter of the link between the first relay terminal and the second relay terminal based on the fifth QoS parameter, and the QoS requirement allocated to the second link can be more appropriate.

According to a fourth aspect, this application provides a communication method. The method includes: A first relay terminal receives a second quality of service QoS parameter from a first terminal, where the second QoS parameter indicates a QoS requirement of a first service that is sent by the first terminal to a second terminal, and the first relay terminal is a relay terminal between the first terminal and the second terminal. The first relay terminal determines a first QoS parameter based on the second QoS parameter, where the first QoS parameter corresponds to a link included between the first relay terminal and the second terminal.

In the foregoing technical solution, the first terminal indicates an end-to-end QoS requirement of the first service to the first relay terminal, and the first relay terminal then allocates a QoS parameter to a link between the first relay terminal and the second terminal, so that the QoS requirement of the service can be considered in a relay scenario. This helps implement end-to-end QoS guarantee.

The first QoS parameter is used to determine a QoS parameter corresponding to the first service on a second link. In other words, the first QoS parameter is used to determine the QoS parameter corresponding to the first service when the first service is transmitted on the second link.

Optionally, information about the first service may include a service type and/or a service requirement. The service type may be a video service, a data service, a voice service, or the like. The service requirement may be a service priority requirement, a service reliability requirement, a service delay requirement, or the like.

Optionally, each QoS parameter in this application may include at least one of the following: a PQI, a flow bit rate, or a link aggregated bit rate. The PQI is a special 5QI, and each PQI value is in a one-to-one correspondence with a PC5 QoS characteristic. The PC5 QoS characteristic may include one or more of the following: a resource type, a priority level, a data packet delay budget, a data packet error rate, a maximum data burst volume, an averaging window, or the like. The resource type includes a GBR, a non-GBR, and the like. The averaging window may be used to calculate a rate corresponding to the GBR, and the data packet delay budget may refer to a delay of a data packet from a terminal A to a terminal B. The flow bit rate includes a guaranteed flow bit rate and a maximum flow bit rate.

Optionally, the first relay terminal may allocate a QoS parameter to each link, so that all links as a whole can meet the QoS requirement of the first service. In this case, the first QoS parameter corresponds to the second link.

Optionally, the first relay terminal may divide the QoS requirement of the first service into two parts, where a first part is allocated to the first link, and a second part is allocated to all subsequent links. Further, the first relay terminal then further divides the second part of the service requirement into two parts, where a first part is allocated to the second link, and a second part is allocated to all subsequent links. The rest may be deduced by analogy. In this case, the first QoS parameter corresponds to all links between the first relay terminal and the second terminal.

With reference to the fourth aspect, in a possible implementation, the method further includes: The first relay terminal determines a third QoS parameter based on the second QoS parameter, where the third QoS parameter is used to determine a QoS parameter corresponding to the first service on a first link, and the first link is a link between the first terminal and the first relay terminal. The first relay terminal sends the third QoS parameter to the first terminal.

The third QoS parameter is used to determine the QoS parameter corresponding to the first service on the first link. In other words, the third QoS parameter is used to determine the QoS parameter corresponding to the first service when the first service is transmitted on the first link.

In the foregoing technical solution, the first terminal indicates an end-to-end QoS requirement of the first service to the first relay terminal, and the first relay terminal then allocates a QoS parameter to each link. The first relay terminal may allocate the QoS parameter to the first link based on the received end-to-end QoS requirement of the first service, and may determine the QoS parameter used when the first service is transmitted on the first link. This helps implement end-to-end QoS guarantee.

With reference to the fourth aspect and any one of the foregoing possible implementations, in another possible implementation, the method further includes: The first relay terminal determines an access stratum configuration of a second link based on the first QoS parameter, where the second link is a link between the first relay terminal and the second terminal or a link between the first relay terminal and a second relay terminal, and the second relay terminal is a relay terminal between the first relay terminal and the second terminal. The first relay terminal receives an access stratum configuration of a first link from the first terminal, where the access stratum configuration of the first link corresponds to the access stratum configuration of the second link. The first relay terminal receives the first service from the first terminal based on the access stratum configuration of the first link, and forwards the first service based on the access stratum configuration of the second link.

In the foregoing technical solution, the first relay terminal determines the access stratum configuration of the second link based on the first QoS parameter, and receives the access stratum configuration of the first link from the first terminal. In this way, the first relay terminal may map the access stratum configuration of the first link to an access stratum configuration for forwarding the first service. When receiving data that corresponds to the first service and that is sent by the first terminal on the access stratum configuration of the first link, the first relay terminal may determine the access stratum configuration for forwarding the data, to correctly forward the data corresponding to the first service.

With reference to the fourth aspect and any one of the foregoing possible implementations, in another possible implementation, that the first relay terminal determines an access stratum configuration of a second link based on the first QoS parameter includes: The first relay terminal receives a fifth QoS parameter from the first terminal, where the fifth QoS parameter is a QoS parameter corresponding to the first service on the first link. The first relay terminal determines a fourth QoS parameter based on the first QoS parameter and the fifth QoS parameter, where the fourth QoS parameter is a QoS parameter corresponding to the first service on the second link. The first relay terminal determines the access stratum configuration of the second link based on the fourth QoS parameter.

The fifth QoS parameter is a QoS parameter corresponding to the first service on the first link. In other words, the fifth QoS parameter is the QoS parameter corresponding to the first service when the first service is transmitted on the first link.

In the foregoing technical solution, the first relay terminal may determine the fourth QoS parameter based on the QoS parameter that corresponds to the first link and that is fed back by the first terminal, so that the QoS requirement allocated to the second link can be more appropriate.

With reference to the fourth aspect and any one of the foregoing possible implementations, in another possible implementation, that the first relay terminal determines a first QoS parameter based on the second QoS parameter includes: The first relay terminal determines the first QoS parameter based on the second QoS parameter and link information, where the link information indicates a link through which the first terminal sends the first service to the second terminal.

In the foregoing technical solution, the first relay terminal allocates the QoS requirement of the first service based on the link information between the first terminal and the second terminal, for example, a quantity of links, so that all links as a whole meet the QoS requirement of the first service. This implements end-to-end QoS guarantee.

With reference to the fourth aspect and any one of the foregoing possible implementations, in another possible implementation, the method further includes: The first relay terminal determines a sixth QoS parameter based on the second QoS parameter, where the sixth QoS parameter is used to determine a QoS parameter corresponding to the first service on a third link, the third link is a link between the second relay terminal and the second terminal or a link between the second relay terminal and a third relay terminal, the second relay terminal is a relay terminal between the first relay terminal and the second terminal, and the third relay terminal is a relay terminal between the second relay terminal and the second terminal. The first relay terminal sends the sixth QoS parameter to the second relay terminal.

The sixth QoS parameter is used to determine the QoS parameter corresponding to the first service on the third link. In other words, the sixth QoS parameter is used to determine the QoS parameter corresponding to the first service w % ben the first service is transmitted on the third link.

When there are a plurality of relay terminals between the first terminal and the second terminal, by using the foregoing technical solution, the first relay terminal may determine a QoS parameter of each link, and send the QoS parameter to each relay terminal.

It should be noted that if necessary (for example, there is another relay terminal between the second relay terminal and the second terminal), the second relay terminal may alternatively perform processing similar to that of the first relay terminal.

According to a fifth aspect, this application provides a communication method. The method includes: A first terminal obtains a first service. The first terminal determines a QoS parameter based on the first service, where the QoS parameter indicates a QoS requirement of the first service that is sent by the first terminal to a second terminal. The first terminal receives first information from a first relay terminal, where the first information includes information about a second link, the second link is a link between the first relay terminal and the second terminal or a link between the first relay terminal and a second relay terminal, the first relay terminal is a relay terminal between the first terminal and the second terminal, and the second relay terminal is a relay terminal between the first relay terminal and the second terminal. The first terminal sends second information to an access network device, where the second information includes the QoS parameter, information about a first link, and the information about the second link, and the first link is a link between the first terminal and the first relay terminal. The first terminal receives third information from the access network device, where the third information includes an access stratum configuration of the first link and the information about the first link. The first terminal sends the first service to the first relay terminal based on the access stratum configuration of the first link.

In the foregoing technical solution, the first terminal may obtain the QoS requirement of the first service, the information from the relay terminal, and the information about the link, and feed back the QoS requirement of the first service, the information from the relay terminal, and the information about the link to the access network device, so that the access network device determines an access stratum configuration for each link, and delivers the access stratum configuration. Further, each relay terminal may generate and store a correspondence between the access stratum configurations of the links, and the first relay terminal may perform QoS processing based on the correspondence between the access stratum configurations. This implements end-to-end QoS guarantee.

Optionally, information about the first service may include a service type and/or a service requirement. The service type may be a video service, a data service, a voice service, or the like. The service requirement may be a service priority requirement, a service reliability requirement, a service delay requirement, or the like.

Optionally, each QoS parameter in this application may include at least one of the following: a PQI, a flow bit rate, or a link aggregated bit rate. The PQI is a special 5QI, and each PQI value is in a one-to-one correspondence with a PC5 QoS characteristic (PC5 QoS characteristic). The PC5 QoS characteristic may include one or more of the following: a resource type, a priority level, a data packet delay budget, a data packet error rate, a maximum data burst volume, an averaging window, or the like. The resource type includes a GBR, a non-GBR, and the like. The averaging window may be used to calculate a rate corresponding to the GBR, and the data packet delay budget may refer to a delay of a data packet from a terminal A to a terminal B. The flow bit rate includes a guaranteed flow bit rate and a maximum flow bit rate.

With reference to the fifth aspect, in a possible implementation, the method further includes: The first terminal sends fourth information to the first relay terminal, where the fourth information includes the access stratum configuration of the first link.

In the foregoing technical solution, the first terminal sends the access stratum configuration of the first link to the first relay terminal, so that the first relay terminal may generate and store a correspondence between the access stratum configurations of the links, and perform QoS processing based on the correspondence between the access stratum configurations. This implements end-to-end QoS guarantee.

With reference to the fifth aspect and any one of the foregoing possible implementations, in another possible implementation, the third information further includes an access stratum configuration of the second link and the information about the second link; and the fourth information further includes the access stratum configuration of the second link and the information about the second link.

In the foregoing technical solution, the access network device may deliver the access stratum configuration of the second link to the first terminal, and the first terminal then forwards the access stratum configuration of the second link to the first relay terminal, so that the first relay terminal may generate and store a correspondence between the access stratum configurations of the links, and perform QoS processing based on the correspondence between the access stratum configurations. This implements end-to-end QoS guarantee.

With reference to the fifth aspect and any one of the foregoing possible implementations, in another possible implementation, the first information further includes information about the first relay terminal; and/or the second information further includes the information about the first relay terminal.

In the foregoing technical solution, the first terminal may obtain the information about the first relay terminal from the first relay terminal, and send the information about the first relay terminal to the access network device, so that the access network device directly delivers the access stratum configuration of the second link to the first relay terminal without forwarding the access stratum configuration of the second link by the first terminal. This helps improve QoS allocation efficiency.

With reference to the fifth aspect and any one of the foregoing possible implementations, in another possible implementation, the first information further includes information about a third link, where the third link is a link between the second relay terminal and the second terminal or a link between the second relay terminal and a third relay terminal, and the third relay terminal is a relay terminal between the second relay terminal and the second terminal; and the second information further includes the information about the third link.

The first terminal may obtain information about a plurality of links from the first relay terminal, so that the foregoing technical solution is applicable to a scenario in which there are a plurality of relay terminals between the first terminal and the second terminal.

According to a sixth aspect, this application provides a communication method. The method includes: A first relay terminal sends first information to a first terminal, where the first information includes information about a second link, the second link is a link between the first relay terminal and a second terminal or a link between the first relay terminal and a second relay terminal, the first relay terminal is a relay terminal between the first terminal and the second terminal, and the second relay terminal is a relay terminal between the first relay terminal and the second terminal. The first relay terminal receives an access stratum configuration of a first link and an access stratum configuration of the second link, where the access stratum configuration of the first link corresponds to the access stratum configuration of the second link, and the first link is a link between the first terminal and the first relay terminal. The first relay terminal receives a first service from the first terminal based on the access stratum configuration of the first link, and forwards the first service based on the access stratum configuration of the second link.

In the foregoing technical solution, the first relay terminal may send the information about the second link to the first terminal, so that the first terminal feeds back the information about the second link to an access network device, and the access network device determines an access stratum configuration for each link, and delivers the access stratum configuration. Further, the first relay terminal may generate and store a correspondence between the access stratum configurations of the links, and perform QoS processing based on the correspondence between the access stratum configurations. This implements end-to-end QoS guarantee.

Optionally, information about the first service may include a service type and/or a service requirement. The service type may be a video service, a data service, a voice service, or the like. The service requirement may be a service priority requirement, a service reliability requirement, a service delay requirement, or the like.

With reference to the sixth aspect, in a possible implementation, that the first relay terminal receives an access stratum configuration of a first link and an access stratum configuration of the second link includes: The first relay terminal receives fourth information from the first terminal, where the fourth information includes the access stratum configuration of the first link, the access stratum configuration of the second link, and the information about the second link.

In the foregoing technical solution, the access network device may deliver both the access stratum configuration of the first link and the access stratum configuration of the second link to the first terminal, and the first terminal then forwards the access stratum configuration of the first link and the access stratum configuration of the second link to the first relay terminal, so that the first relay terminal may generate and store a correspondence between the access stratum configurations of the links, and perform QoS processing based on the correspondence between the access stratum configurations. This implements end-to-end QoS guarantee.

With reference to the sixth aspect and any one of the foregoing possible implementations, in another possible implementation, the first information further includes information about the first relay terminal; and that the first relay terminal receives an access stratum configuration of a first link and an access stratum configuration of the second link includes: The first relay terminal receives fifth information from the access network device, where the fifth information includes the access stratum configuration of the first link, the access stratum configuration of the second link, and at least one of information about the first link or the information about the second link.

In the foregoing technical solution, the first relay terminal may send the information about the first relay terminal to the first terminal, so that the first terminal sends the information about the first relay terminal to the access network device, and the access network device may directly deliver the access stratum configuration of the second link to the first relay terminal without forwarding the access stratum configuration of the second link by the first terminal. This helps improve QoS allocation efficiency.

With reference to the sixth aspect and any one of the foregoing possible implementations, in another possible implementation, the first information further includes information about the first relay terminal; and that the first relay terminal receives an access stratum configuration of a first link and an access stratum configuration of the second link includes: The first relay terminal receives fifth information from the access network device, where the fifth information includes the information about the second link and the access stratum configuration of the second link. The first relay terminal receives fourth information from the first terminal, where the fourth information includes the access stratum configuration of the first link.

In the foregoing technical solution, the first relay terminal obtains the access stratum configuration of the first link from the first terminal, and obtains the access stratum configuration of the second link from the access network device. In this way, the first relay terminal may generate and store a correspondence between the access stratum configurations of the links, and further perform QoS processing based on the correspondence between the access stratum configurations. This implements end-to-end QoS guarantee.

With reference to the sixth aspect and any one of the foregoing possible implementations, in another possible implementation, the first information further includes information about a third link, where the third link is a link between the second relay terminal and the second terminal or a link between the second relay terminal and a third relay terminal, and the third relay terminal is a relay terminal between the second relay terminal and the second terminal.

The first relay terminal may send information about a plurality of links to the first terminal, so that the foregoing technical solution is applicable to a scenario in which there are a plurality of relay terminals between the first terminal and the second terminal.

According to a seventh aspect, this application provides a communication method. The method includes: An access network device receives second information from a first terminal, where the second information includes a quality of service QoS parameter, information about a first link, and information about a second link, where the QoS parameter indicates a QoS requirement of a first service that is sent by the first terminal to a second terminal, the first link is a link between the first terminal and a first relay terminal, the second link is a link between the first relay terminal and the second terminal or a link between the first relay terminal and a second relay terminal, the first relay terminal is a relay terminal between the first terminal and the second terminal, and the second relay terminal is a relay terminal between the first relay terminal and the second terminal. The access network device determines an access stratum configuration of the first link and an access stratum configuration of the second link based on the second information. The access network device sends the access stratum configuration of the first link and the information about the first link to the first terminal. The access network device sends the access stratum configuration of the second link and at least one of the information about the first link or the information about the second link.

In the foregoing technical solution, the access network device may determine an access stratum configuration for each link based on the QoS parameter, the information about the first link, and the information about the second link, and deliver the access stratum configuration, so that the first relay terminal may generate and store a correspondence between the access stratum configurations of the links, and perform QoS processing based on the correspondence between the access stratum configurations. This implements end-to-end QoS guarantee.

With reference to the seventh aspect, in a possible implementation, that the access network device sends the access stratum configuration of the second link and at least one of the information about the first link or the information about the second link includes: The access network device sends the access stratum configuration of the second link and the information about the second link to the first terminal.

In the foregoing technical solution, the access network device may deliver both the access stratum configuration of the first link and the access stratum configuration of the second link to the first terminal, and the first terminal then forwards the access stratum configuration of the first link and the access stratum configuration of the second link to the first relay terminal, so that the first relay terminal may generate and store a correspondence between the access stratum configurations of the links, and perform QoS processing based on the correspondence between the access stratum configurations. This implements end-to-end QoS guarantee.

With reference to the seventh aspect and any one of the foregoing possible implementations, in another possible implementation, the second information further includes information about the first relay terminal, and that the access network device sends the access stratum configuration of the second link and at least one of the information about the first link or the information about the second link includes: The access network device sends the access stratum configuration of the second link and the information about the second link to the first relay terminal; or the access network device sends the access stratum configuration of the first link, the access stratum configuration of the second link, and at least one of the information about the first link or the information about the second link to the first relay terminal.

In the foregoing technical solution, the first relay terminal obtains the access stratum configuration of the first link from the first terminal, and obtains the access stratum configuration of the second link from the access network device, or the first relay terminal obtains the access stratum configuration of the first link and the access stratum configuration of the second link from the access network device. In this way, the first relay terminal may generate and store a correspondence between the access stratum configurations of the links, and further perform QoS processing based on the correspondence between the access stratum configurations. This implements end-to-end QoS guarantee.

According to an eighth aspect, this application provides a communication apparatus. The communication apparatus may be a terminal or a component in a terminal. The communication apparatus may include: modules or units configured to perform the method in any one of the first aspect or the possible implementations of the first aspect, or modules or units configured to perform the method in any one of the third aspect or the possible implementations of the third aspect, or modules or units configured to perform the method in any one of the fifth aspect or the possible implementations of the fifth aspect.

According to a ninth aspect, this application provides a communication apparatus. The communication apparatus may be a relay terminal or a component in a relay terminal. The communication apparatus may include: modules or units configured to perform the method in any one of the second aspect or the possible implementations of the second aspect, or modules or units configured to perform the method in any one of the fourth aspect or the possible implementations of the fourth aspect, or modules or units configured to perform the method in any one of the sixth aspect or the possible implementations of the sixth aspect.

According to a tenth aspect, this application provides a communication apparatus. The communication apparatus may be an access network device or a component in an access network device. The communication apparatus may include modules or units configured to perform the method in any one of the seventh aspect or the possible implementations of the seventh aspect.

These units in the foregoing each apparatus may include: a processing unit and a transceiver unit. The transceiver unit is configured to receive and send information, and the processing unit performs processing in the foregoing method.

According to an eleventh aspect, this application provides a communication apparatus, including a processor. The processor is coupled to a memory, and may be configured to execute instructions in the memory, to implement the method in any one of the first aspect or the possible implementations of the first aspect, or the method in any one of the third aspect or the possible implementations of the third aspect, or the method in any one of the fifth aspect or the possible implementations of the fifth aspect.

According to a twelfth aspect, this application provides a communication apparatus, including a processor. The processor is coupled to a memory, and may be configured to execute instructions in the memory, to implement the method in any one of the second aspect or the possible implementations of the second aspect, or the method in any one of the fourth aspect or the possible implementations of the fourth aspect, or the method in any one of the sixth aspect or the possible implementations of the sixth aspect.

According to a thirteenth aspect, this application provides a communication apparatus, including a processor. The processor is coupled to a memory, and may be configured to execute instructions in the memory, to implement the method in any one of the seventh aspect or the possible implementations of the seventh aspect.

Optionally, the foregoing each communication apparatus including the processor further includes the memory. Optionally, the communication apparatus further includes a communication interface. The processor is coupled to the communication interface. The communication interface is configured to input and/or output information, and the information includes at least one of instructions or data.

In an implementation, the communication interface may be a transceiver or an input/output interface.

Optionally, the transceiver may be a transceiver circuit. Optionally, the input/output interface may be an input/output circuit.

In another implementation, the communication apparatus is a chip or a chip system. When the communication apparatus is the chip or the chip system, the communication interface may be an input/output interface, an interface circuit, an output circuit, an input circuit, a pin, a related circuit, or the like. The processor may alternatively be embodied as a processing circuit or a logic circuit.

According to a fourteenth aspect, this application provides a processor, including: an input circuit, an output circuit, and a processing circuit. The processing circuit is configured to: receive a signal through the input circuit, and transmit a signal through the output circuit, so that the processor performs the methods in the foregoing aspects.

During specific implementation, the processor may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a fifteenth aspect, this application provides a processing apparatus, including: a communication interface and a processor. The communication interface is coupled to the processor. The communication interface is configured to input and/or output information. The information includes at least one of instructions or data. The processor is configured to execute a computer program, so that the processing apparatus performs the methods in the foregoing aspects.

According to a sixteenth aspect, this application provides a processing apparatus, including: a processor and a memory. The processor is configured to: read instructions stored in the memory, receive a signal by using a receiver, and transmit a signal by using a transmitter, so that the processing apparatus performs the methods in the foregoing aspects.

Optionally, there are one or more processors. If there is a memory, there may alternatively be one or more memories.

Optionally, the memory may be integrated with the processor, or the memory and the processor are separately disposed.

During specific implementation, the memory may be a non-transitory (non-transitory) memory, such as a read-only memory (read-only memory, ROM). The memory and the processor may be integrated into one chip, or may be separately disposed in different chips. A type of the memory and a manner in which the memory and the processor are disposed are not limited in this embodiment of this application.

It should be understood that a related information exchange process, for example, sending indication information, may be a process of outputting the indication information from the processor, and receiving the indication information may be a process of inputting the received indication information to the processor. Specifically, the information output by the processor may be output to the transmitter, and the input information received by the processor may be from the receiver. The transmitter and the receiver may be collectively referred to as a transceiver.

The apparatuses according to the fifteenth aspect and the sixteenth aspect may each be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated in the processor, or may be located outside the processor and exist independently.

According to a seventeenth aspect, this application provides a computer program product. The computer program product includes a computer program (also referred to as code or instructions). When the computer program is run, a computer is enabled to perform the methods in the foregoing aspects.

According to an eighteenth aspect, this application provides a computer-readable medium. The computer-readable medium stores a computer program (also referred to as code or instructions). When the computer program is run on a computer, the computer is enabled to perform the methods in the foregoing aspects.

According to a nineteenth aspect, this application provides a communication system, including the foregoing terminal and relay device, or the foregoing terminal, relay device, and access network device.

BRIEF DESCRIPTION OF DRAWINGS

FIG. 9A and FIG. 9B are a schematic flowchart of another communication method according to this application;

FIG. 11A and FIG. 11B are a schematic flowchart of another communication method according to this application:

FIG. 12A and FIG. 12B are a schematic flowchart of another communication method according to this application;

DESCRIPTION OF EMBODIMENTS

Figure 1:
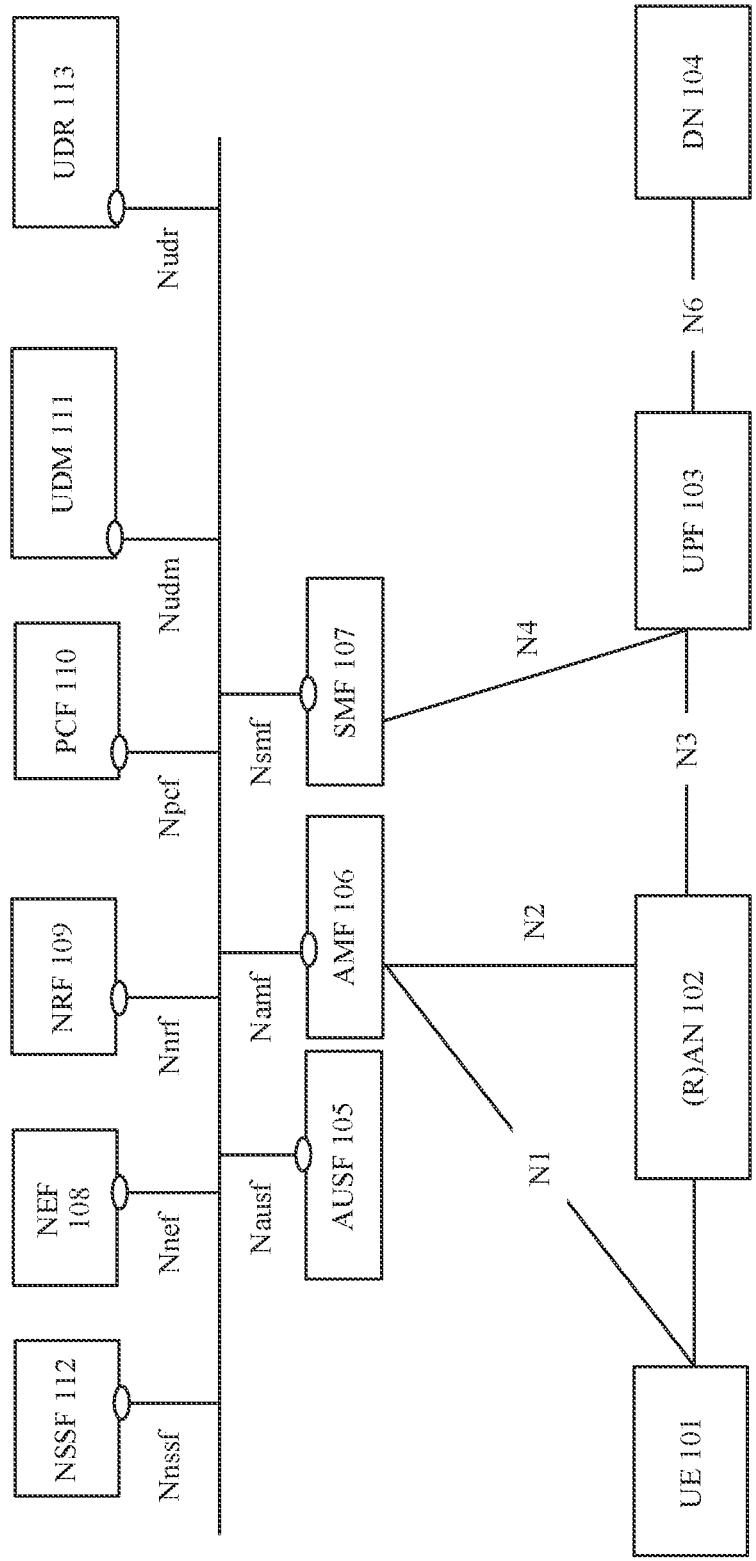
FIG. 1 is a schematic diagram of a network architecture to which an embodiment of this application is applicable.

The following describes technical solutions of this application with reference to the accompanying drawings.

The technical solutions of embodiments of this application may be applied to various communication systems, such as a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, LTE time division duplex (time division duplex, TDD), a universal mobile telecommunications system (universal mobile telecommunication system, UMTS), a worldwide interoperability for microwave access (worldwide interoperability for microwave access, WiMAX) communication system, a future 5th generation (5th generation, 5G) communication system, or a future new radio (new radio, NR) communication system.

A terminal or a relay terminal in embodiments of this application may be a user equipment (user equipment, UE), an access terminal, a subscriber unit, a subscriber station, a mobile station, a remote station, a remote terminal, a mobile device, a user terminal, a terminal device, a wireless communication device, a user agent, a user apparatus, a handheld terminal, a notebook computer, a cellular phone, a smartphone, a tablet computer, a handheld device, an augmented reality (augmented reality, AR) device, a virtual reality (virtual reality, VR) device, a machine-type communication terminal, or another device that can access a network. The terminal may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal in a future 5G network, a terminal in a future evolved public land mobile network (public land mobile network, PLMN), or the like. This is not limited in embodiments of this application. In this application, mutual communication between the terminal and an access network device may be performed by using an air interface technology (for example, an NR or LTE technology). Similarly, mutual communication between the terminals, mutual communication between the terminal and the relay terminal, and mutual communication between the relay terminals may all be performed by using the air interface technology (for example, the NR or LTE technology). Certainly, the air interface technology may alternatively be a technology other than the NR and LTE technologies.

In Internet of Vehicles communication, a communication terminal carried on a vehicle is a terminal device, and a road side unit (road side unit, RSU) may also be used as a terminal. A communication terminal carried on an unmanned aerial vehicle may be considered as a terminal.

The access network device in embodiments of this application may be a device configured to communicate with the terminal, and is mainly responsible for functions such as radio resource management, quality of service management, and data compression and encryption on an air interface side. The access network device may include base stations in various forms. The access network device may be a base transceiver station (base transceiver station, BTS) in the global system for mobile communications GSM or the CDMA system, a NodeB (NodeB, NB) in the WCDMA system, an evolved NodeB (evolved NodeB, eNB or eNodeB) in the LTE system, or a radio controller in a cloud radio access network (cloud radio access network, C-RAN) scenario, or the access network device may be a relay station, an access point, a vehicle-mounted device, a wearable device, an access network device in the future 5G network or an access network device in the future evolved PLMN network, one or a group of antenna panels (including a plurality of antenna panels) of a base station in the 5G system, or a network node that forms a next generation NodeB (next generation NodeB or gNB) or a transmission point, for example, a baseband unit (baseband unit, BBU) or a distributed unit (distributed unit, DU). This is not limited in embodiment of this application.

In some deployments, the gNB may include a centralized unit (centralized unit, CU) and the DU. The gNB may further include an active antenna unit (active antenna unit, AAU). The CU implements some functions of the gNB, and the DU implements some functions of the gNB. For example, the CU is responsible for processing a non-real-time protocol and a service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node. In addition, the CU may be classified into a network device in a radio access network (radio access network, RAN), or the CU may be classified into a network device in a core network (core network, CN). This is not limited in this application.

In embodiments of this application, the terminal, the relay terminal, or the access network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code for the method provided in embodiments of this application can be run to perform communication according to the method provided in embodiments of this application. For example, the execution body of the method provided in embodiments of this application may be the terminal or the access network device, or a functional module that is in the terminal or the access network device and that can invoke and execute the program.

In addition, aspects or features of this application may be implemented as a method, an apparatus, or a product that uses standard programming and/or engineering technologies. For example, a computer-readable medium may include but is not limited to: a magnetic storage device (for example, a hard disk, a floppy disk, or a magnetic tape), an optical disc (for example, a compact disc (compact disc, CD) or a digital versatile disc (digital versatile disc, DVD)), or a smart card and a flash memory device (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include and/or carry instructions and/or data.

FIG. 1 is a schematic diagram of a network architecture to which an embodiment of this application is applicable. A 5G network architecture is used as an example. The network architecture includes: a terminal 101, a (radio) access network device (radio access network, (R)AN) 102, a user plane function (user plane function, UPF) network element 103, a data network (data network. DN) network element 104, an authentication server function (authentication server function, AUSF) network element 105, an AMF network element 106, a session management function (session management function, SMF) network element 107, a network exposure function (network exposure function, NEF) network element 108, a network repository function (network repository function, NRF) network element 109, a policy control function (policy control function, PCF) network element 110, a unified data management (unified data management, UDM) network element 111, an NSSF network element 112, and a unified data repository (unified data repository, UDR) network element 113. In the following descriptions, the UPF network element 103, the DN network element 104, the AUSF network element 105, the AMF network element 106, the SMF network element 107, the NEF network element 108, the NRF network element 109, the policy control function (policy control function. PCF) network element 110, the UDM network element 111, the NSSF network element 112, and the UDR network element 113 are briefly referred to as a UPF 103, a DN 104, an AUSF 105, an AMF 106, an SMF 107, an NEF 108, an NRF 109, a PCF 110, a UDM 111, an NSSF 112, and a UDR 113.

The terminal 101 accesses a 5G network and obtains a service mainly through a radio air interface. The terminal interacts with the RAN through an air interface, and interacts with the AMF of a core network by using non-access stratum (non-access stratum, NAS) signaling. The RAN 102 is responsible for scheduling an air interface resource for the terminal to access a network and responsible for air interface connection management. The UPF 103 is responsible for forwarding and receiving of user data in the terminal. For example, the UPF may receive user data from a data network, and transmit the user data to the terminal by using an access network device. Alternatively, the UPF may receive user data from the terminal by using an access network device, and forward the user data to a data network. A transmission resource and a scheduling function in the UPF 103 that provide a service for the terminal are managed and controlled by the SMF network element. The AUSF 105 is a core network control plane network element, and is mainly responsible for authenticating and authorizing a user to ensure that the user is an authorized user. The AMF 106 is a core network element, and is mainly responsible for signaling processing, for example, functions such as access control, mobility management, attachment and detachment, and gateway selection. In addition, when providing a service for a session in the terminal, the AMF 106 may further provide control plane storage resources for the session, to store a session identifier, an SMF network element identifier related to the session identifier, and the like. The SMF 107 is responsible for user plane network element selection, user plane network element redirection, internet protocol (internet protocol, IP) address allocation, bearer establishment, modification, and release, and QoS control. The NEF 108 is a core network control plane network element, and is responsible for opening a mobile network capability. The NRF 109 is a core network control plane network element, and is responsible for dynamic registration of a service capability of a network function and network function discovery. The PCF 110 mainly supports providing a unified policy framework to control network behavior, and providing a policy rule for a control layer network function, and is responsible for obtaining policy decision-related subscription information of a user. The UDM 111 is a core network control plane network element and a home subscriber server. The UDM may be used for unified data management, and supports functions such as 3GPP authentication, user identity operation, permission granting, registration, and mobility management. The NSSF 112 is configured to complete a network slice selection function for the terminal. The NSSF 112 is a core network control plane entity, and is responsible for selecting a target NSI. The UDR 113 is responsible for storing and providing terminal subscription data, or storing and providing terminal policy data.

In the network architecture, Nausf is a service-based interface presented by the AUSF 105, Namf is a service-based interface presented by the AMF 106, Nsmf is a service-based interface presented by the SMF 107, Nnef is a service-based interface presented by the NEF 108, Nnrf is a service-based interface presented by the NRF 109, Npcf is a service-based interface presented by the PCF 110, Nudm is a service-based interface presented by the UDM 111, Nnssf is a service-based interface presented by NSSF 112, and Nudr is a service-based interface presented by the UDR 113. N1 is an interface between the UE 101 and the AMF 106. N2 is an interface between the (R)AN 102 and the AMF 106, and is used to send a non-access stratum (non-access stratum, NAS) message and the like. N3 is an interface between the (R)AN 102 and the UPF 103, and is used to transmit user plane data and the like. N4 is an interface between the SMF 107 and the UPF 103, and is used to transmit information such as N3-connection tunnel identifier information, data buffer indication information, and a downlink data notification message. The N6 interface is an interface between the UPF 103 and the DN 104, and is used to transmit user plane data and the like.

Figure 2:
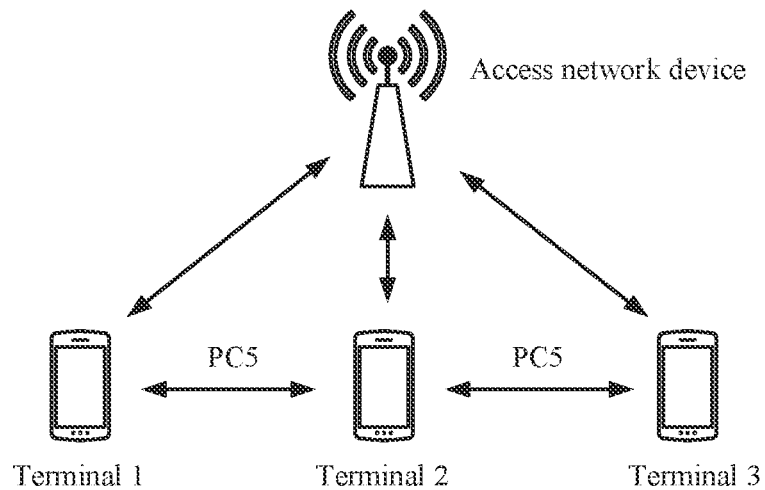
FIG. 2 is a schematic diagram of another network architecture to which an embodiment of this application is applicable.

FIG. 2 is a schematic diagram of another network architecture to which an embodiment of this application is applicable. With rapid development of mobile communication, universal use of new service types, for example, data services such as video chat and VR/AR, increases a bandwidth requirement of a user. Device-to-device (Device-to-Device, D2D) communication allows direct communication between terminals (User Equipments, UEs), and the terminals may share spectrum resources with cell users under control of a cell network, so that utilization of the spectrum resources is effectively improved. When a distance between two terminals that perform D2D communication is large, assistance may be performed by using a relay terminal (relay UE). For example, as shown in FIG. 2, D2D communication between a terminal 1 and a terminal 3 may be implemented through communication between the terminal 1 and a terminal 2 and communication between the terminal 2 and the terminal 3. The communication between the terminal 1 and the terminal 2 and the communication between the terminal 2 and the terminal 3 may be performed through an interface. The interface may be used for information transmission on a data plane and a control plane. The interface may be a PC5 interface. For ease of description, the PC5 interface is used as an example below. The terminal 2 is a relay terminal between the terminal 1 and the terminal 3. It should be noted that there may be more relay terminals between the terminal 1 and the terminal 3.

For ease of description, an end-to-end (UE-to-UE, U2U) relay scenario shown in FIG. 2 is briefly referred to as a relay scenario below.

Figure 3:
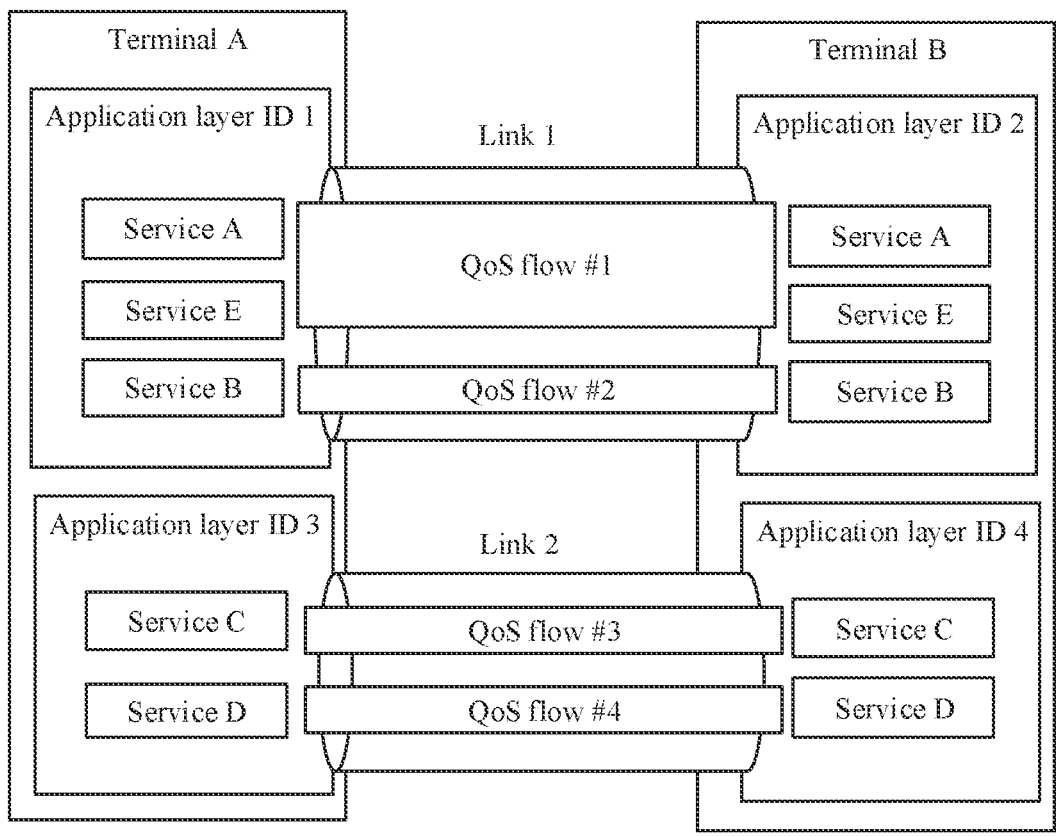
FIG. 3 is a schematic diagram of a QoS model based on a QoS flow according to an embodiment of this application.

In D2D communication in 5G, one or more links (link) may be established between the terminals. For example, one or more PC5 links may be established between the terminals. The terminal allocates a link identifier (link identifier) to each link to identify different links. The terminal may further allocate a layer 2 identifier (layer 2 identifier) to each link to send and receive data of a corresponding link. The layer 2 identifier allocated by the terminal to the link may also be understood as a source layer 2 identifier. The layer 2 identifier may also be referred to as a layer 2 address, and is collectively used below. Each link corresponds to a pair of application layer IDs, which may be understood as that the link is used to transmit data between the pair of application layer IDs. For example, as shown in FIG. 3, a link 1 and a link 2 are established between a terminal A and a terminal B. The link 1 corresponds to an application layer ID 1 of the terminal A and an application layer ID 2 of the terminal B, and the link 2 corresponds to an application layer ID 3 of the terminal A and an application layer ID 4 of the terminal B.

In D2D communication in 5G, a QoS model based on a QoS flow (flow) may be used. One or more QoS flows may be established on each link. Each QoS flow may be identified by one QoS flow identifier (QoS flow identifier, PFI), and the PFI uniquely identifies one QoS flow on the link. For example, as shown in FIG. 3, two QoS flows, namely, a QoS flow #1 used to transmit services A and E and a QoS flow #2 used to transmit a service B, are established on the link 1, and two QoS flows, namely, a QoS flow #3 used to transmit a service C and a QoS flow #4 used to transmit a service D, are established on the link 2.

The QoS flow in D2D communication may be further classified into a guaranteed bit rate (guaranteed bit rate, GBR) QoS flow and a non-guaranteed bit rate (non-guaranteed bit rate, non-GBR) QoS flow.

For QoS management in a D2D scenario, the terminal may obtain a QoS mapping configuration from a PCF during registration. Specifically, the PCF sends the QoS mapping configuration to the terminal in a terminal configuration update (UE configuration update, UCU) procedure by using an AMF. A manner in which the PCF obtains the QoS mapping configuration may be as follows: An application server generates the QoS mapping configuration, and sends the QoS mapping configuration to a UDR by using an NEF network element, and the UDR notifies the PCF of the QoS mapping configuration as subscription data of the terminal. The QoS mapping configuration may include:

(1) a correspondence between a service type or a service requirement and a QoS parameter (such as a PQI or an MFBR/GFBR); and (2) a correspondence between the QoS parameter and an access stratum (access stratum, AS) configuration.

The service type may be a video service, a data service, a voice service, or the like. The service requirement may be a service priority requirement, a service reliability requirement, a service delay requirement, or the like.

The QoS parameter may include at least one of the following: a PQI (PC5 5QI), a flow bit rate (flow bit rate), or a link aggregated bit rate (link aggregated bit rate). The PQI is a special 5QI, and each PQI value is in a one-to-one correspondence with a PC5 QoS characteristic (PC5 QoS characteristic). The PC5 QoS characteristic may include one or more of the following: a resource type (resource type), a priority level (priority level), a data packet delay budget (packet delay budget), a data packet error rate (packet error rate), a maximum data burst volume (maximum data burst volume), an averaging window (averaging window), or the like. The resource type includes a GBR, a non-GBR, and the like. The averaging window may be used to calculate a rate corresponding to the GBR, and the data packet delay budget may refer to a delay of a data packet from a terminal A to a terminal B. The flow bit rate includes a guaranteed flow bit rate (guaranteed flow bit rate, GFBR) and a maximum flow bit rate (maximum flow bit rate, MFBR).

The access stratum configuration may include at least one of a sidelink radio bearer (sidelink radio bear) configuration or a logical channel (logical channel) configuration. The sidelink radio bearer configuration may include a PDCP entity configuration, an RLC entity configuration, and the like. The logical channel configuration may include a logical channel priority configuration and the like.

The terminal obtains the service type or the service requirement from the application layer, and may determine the QoS parameter based on the foregoing configuration (1).

When the terminal is not in a network service, the terminal may further determine, based on a QoS parameter corresponding to the service and the foregoing configuration (2), an access stratum configuration that is not in the network service. That is, an autonomous scheduling mode is used. That the terminal is not in a network service may be understood as that the terminal is out of network coverage (out of coverage).

When the terminal is in a network service, the terminal requests an access stratum configuration from a RAN. That is, a RAN scheduling mode is used. Specifically, the terminal sends the QoS parameter, link information, a communication mode, and the like to the RAN, and the RAN determines the access stratum configuration corresponding to the QoS parameter, and delivers the access stratum configuration corresponding to the QoS parameter to the terminal. The link information may include a destination layer 2 identifier, a link identifier, or the like. The communication mode may include unicast, multicast, broadcast, or the like. That the terminal is in a network service may be understood as that the terminal is in network coverage (in coverage).

Figure 4:
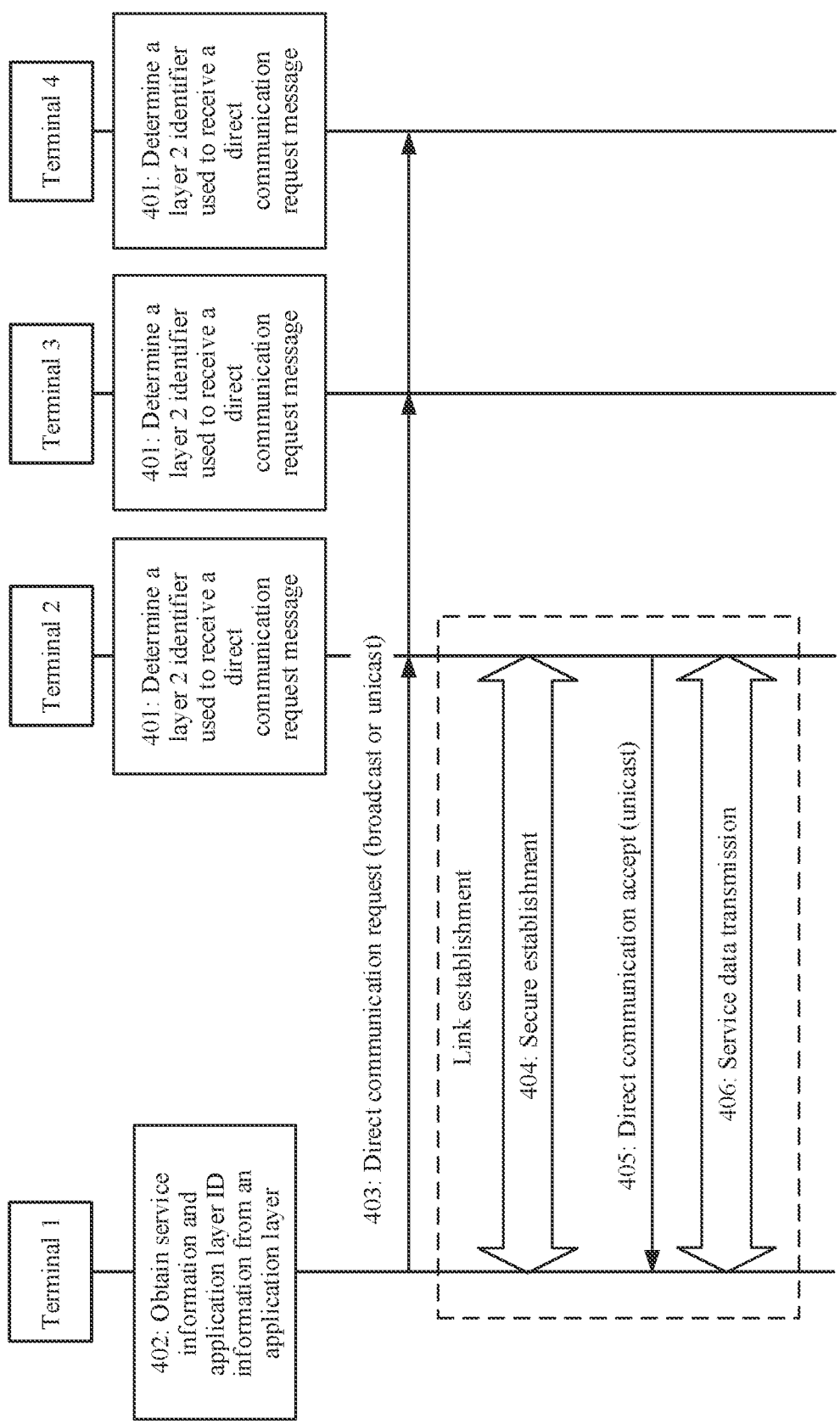
FIG. 4 is a schematic diagram of a link establishment procedure.

FIG. 4 is a schematic diagram of a link establishment procedure. In a 5G system, as shown in FIG. 4, a link established between a terminal 1 and a terminal 2 is used as an example. The procedure of establishing the link between the terminals is as follows.

401: The terminal 2 determines a layer 2 identifier used to receive a direct communication request message (direct communication request), where the layer 2 identifier is configured on a terminal 2 side. This process is similar to that of a terminal 3 and a terminal 4.

402: The terminal 1 obtains service information and application layer ID information from an application layer.

The service information includes at least one of the following: a service type or a service requirement.

403: The terminal 1 sends the direct communication request message to the terminal 2, where the direct communication request message is sent by using a source layer 2 identifier (source L2 ID) and a destination layer 2 identifier (destination L2 ID). The source layer 2 identifier is a layer 2 identifier of the terminal 1, and is allocated by the terminal 1. The destination layer 2 identifier is a layer 2 identifier that is configured by a system and that is used to send the direct communication request message. The direct communication request message may be sent in a unicast or broadcast manner.

404: The terminal 1 and the terminal 2 establish a secure connection, and after the secure connection is established, the terminal 1 sends QoS flow information to the terminal 2.

The QoS flow information includes a PFI and a QoS parameter corresponding to the PFI. The QoS parameter herein may be determined by the terminal 1 based on the service information. Further, the terminal 1 generates a QoS flow for transmitting a corresponding service, and the PFI is an identifier of the QoS flow.

405: The terminal 2 sends a direct communication accept (direct communication accept) message to the terminal 1, where in the direct communication accept message, the source layer 2 identifier is a layer 2 identifier of the terminal 2, and the destination layer 2 identifier is a layer 2 identifier of the terminal 1.

In this way, the terminal 1 and the terminal 2 communicate and determine the layer 2 identifiers of a receive side and a transmit side in D2D communication, and the layer 2 identifiers of the receive side and the transmit side may uniquely identify one link. The terminal 1 and the terminal 2 may further identify a link between the two terminals by using link identifiers, and the link identifiers used in the terminal 1 and the terminal 2 may be the same or different.

406: The terminal 1 and the terminal 2 may transmit data to each other through the link established in the foregoing steps. Specifically, data between an application layer ID of the terminal 1 and an application layer ID of the terminal 2 is transmitted through the link established in the foregoing steps.

In the link establishment procedure or a link update procedure, the terminals negotiate the QoS flow information with each other, and establish the QoS flow (for example, by using the foregoing step 404). For each QoS flow, the QoS flow information includes a PFI and a QoS parameter corresponding to the PFI. The terminal may derive a QoS rule (QoS rule), used to represent a correspondence between the service type or the service requirement and the PFI. For example, in FIG. 3, the services A and E correspond to the QoS flow #1, the service B corresponds to the QoS flow #2, the service C corresponds to the QoS flow #3, and the service D corresponds to the QoS flow #4. After the link is established or the link is updated, the terminal may obtain, based on the QoS parameter corresponding to the QoS flow (for example, in the RAN scheduling mode or the autonomous scheduling mode described above), an access stratum configuration corresponding to the QoS flow.

When sending the data, the terminal maps the data between the application layers to the QoS flow identifier PFI according to the QoS rule, obtains the access stratum configuration based on the QoS flow identifier PFI, and then sends the corresponding data based on the access stratum configuration.

A case in which a relay terminal exists between the terminal 1 and the terminal 2 does not occur in the link establishment procedure shown in FIG. 4.

Figure 5:
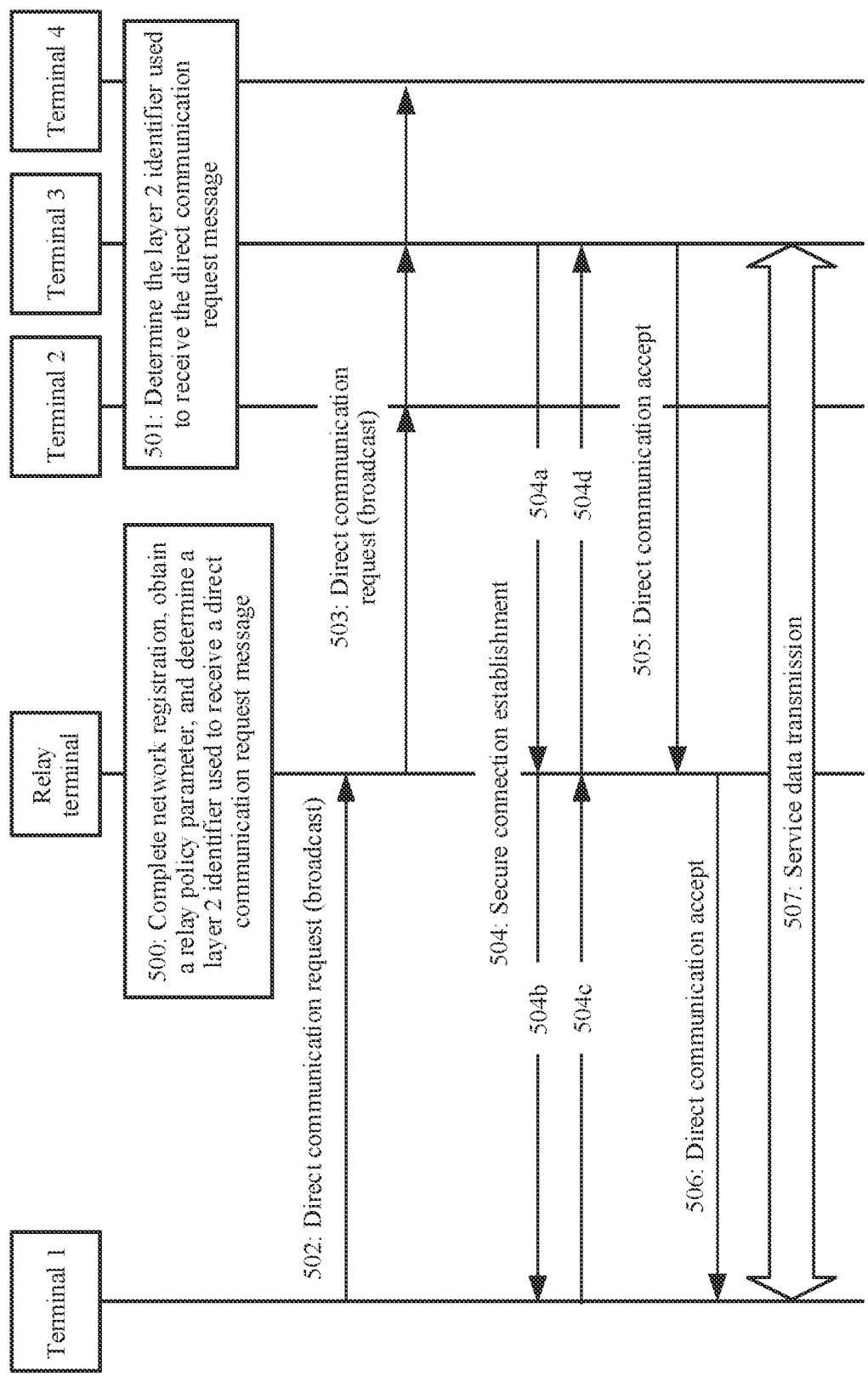
FIG. 5 is a schematic diagram of a link establishment procedure in a relay scenario.

FIG. 5 is a schematic diagram of a link establishment procedure in a relay scenario. Because a distance between the terminal 1 and the terminal 3 may be large, a direct communication link cannot be established between the terminal 1 and the terminal 3. A link established between the terminal 1 and the terminal 3 is used as an example. The link establishment procedure in the relay scenario is as follows. It should be noted that a direct communication request message in the following may alternatively be a non-direct communication request message.

500: The relay terminal completes network registration and obtains a relay policy parameter. The relay terminal determines a layer 2 identifier used to receive a direct communication request message. Specifically, the relay terminal indicates relay capability information when registering with a network, and the network delivers the relay policy parameter based on the relay capability information. The relay policy parameter may include at least one of the following: a PLMN in which the relay terminal is allowed to transmit relay data or a relay service allowed to be transmitted by the relay terminal.

501: The terminal 3 determines the layer 2 identifier used to receive the direct communication request message. This process is similar to that of the terminal 2 and the terminal 4.

502: The terminal 1 sends the direct communication request message. The direct communication request message includes an application layer ID of the terminal 3. The terminal 1 may send the direct communication request message in a broadcast manner. Correspondingly, the relay terminal receives the direct communication request message.

503: After receiving the direct communication request message sent by the terminal 1, the relay terminal determines that the application layer ID in the message does not belong to the relay terminal, and forwards the direct communication request message, where the message includes the application layer ID of the terminal 3. The relay terminal may forward the direct communication request message in a broadcast manner. Correspondingly, the terminal 3 receives the direct communication request message.

504: The terminal 1 and the terminal 3 establish a secure connection, and during the establishment, exchange information between the terminal 1 and the terminal 3 is forwarded by using the relay terminal. Specifically, the terminal 3 determines that the application layer ID in the message belongs to the terminal, and requests, by using the relay terminal, the terminal 1 to establish the secure connection.

505: After establishment of the secure connection between the terminal 1 and the terminal 3 is completed, the terminal 3 sends a direct communication accept message to the relay terminal. After receiving the direct communication accept message sent by the terminal 3, the relay terminal completes establishment of a link between the relay terminal and the terminal 3.

506. After receiving the direct communication accept message sent by the terminal 3, the relay terminal sends the direct communication accept message to the terminal 1. After receiving the direct communication accept message sent by the relay terminal, the terminal 1 completes establishment of a link between the terminal 1 and the relay terminal.

In this way, the terminal 1 communicates with the terminal 3 through the link between the terminal 1 and the relay terminal and the link between the relay terminal and the terminal 3. The relay terminal generates and stores a correspondence between the link between the terminal 1 and the relay terminal and the link between the relay terminal and the terminal 3, namely, link mapping (link mapping).

507: When data needs to be transmitted between the terminal 1 and the terminal 3, the relay terminal forwards the data between the terminal 1 and the terminal 3 based on the stored correspondence. For example, the link between the terminal 1 and the relay terminal is a link 1, the link between the relay terminal and the terminal 3 is a link 2, and the link 1 corresponds to the link 2. The relay terminal stores a correspondence between the link 1 and the link 2. When the terminal 1 sends data to the terminal 3, the terminal 1 sends the data to the relay terminal through the link 1, and the relay terminal determines, by using the stored correspondence between the link 1 and the link 2, that the data sent by the terminal 1 through the link 1 needs to be forwarded to the terminal 3 through the link 2. In this way, the data is transmitted between the terminal 1 and the terminal 3.

In the relay scenario, a current technical solution relates only to the relay link establishment procedure, and is mainly about how the relay terminal generates and stores the correspondence between the links, and does not consider management of another aspect such as QoS.

For the foregoing problem, this application provides a communication method, to consider a QoS requirement of a service in a relay scenario. This helps implement end-to-end QoS guarantee.

The technical solutions of this application may be applied to a scenario in which there are one or more relay terminals between a source terminal and a target terminal. For ease of description, in the following, the source terminal is collectively referred to as a first terminal, and the target terminal is collectively referred to as a second terminal.

In this application, "first", "second", and the like are used to distinguish between QoS parameters. It should be understood that different QoS parameters may be understood as that included parameter types and/or values of various types of parameters are different. It should be further understood that "first", "second", and the like are merely used to distinguish between the QoS parameters, and constitute no limitation on the QoS parameters.

Scenario 1: There is one relay terminal between the first terminal and the second terminal.

(1) The first terminal allocates the QoS parameters.

Figure 6:
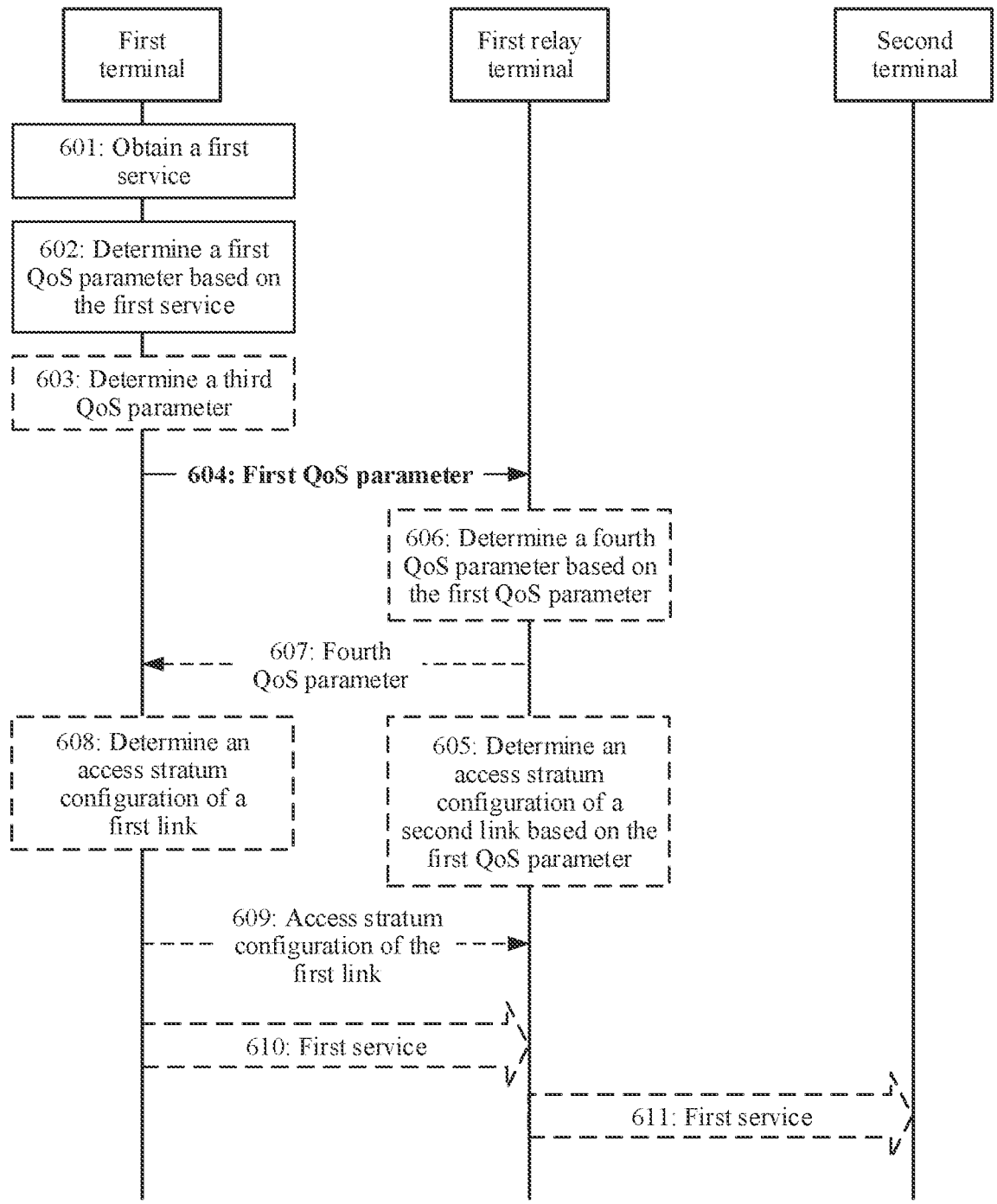
FIG. 6 is a schematic flowchart of a communication method according to this application.

FIG. 6 is a schematic flowchart of a communication method according to this application. The method shown in FIG. 6 may be performed by the first terminal, a first relay terminal, and the second terminal, or may be performed by chips or modules in the first terminal, a first relay terminal, and the second terminal. In FIG. 6, the communication method in this embodiment of this application is described by using an example in which the first terminal, the first relay terminal, and the second terminal are execution bodies. The method shown in FIG. 6 may include at least a part of the following content.

For ease of description, in the following, a link between the first terminal and the first relay terminal is referred to as a first link, and a link between the first relay terminal and the second terminal is referred to as a second link.

601: The first terminal obtains a first service. A target terminal of the first service is the second terminal. In other words, the first service is a service sent by the first terminal to the second terminal.

Optionally, the first terminal obtains the first service from an application layer.

The first service is not specifically limited in this embodiment of this application, and the first service may be any service that needs to be sent by the first terminal.

In some embodiments, information about the first service may include a service type and/or a service requirement. The service type may be a video service, a data service, a voice service, or the like. The service requirement may be a service priority requirement, a service reliability requirement, a service delay requirement, or the like.

602: The first terminal determines a first QoS parameter based on the first service. The first QoS parameter corresponds to the link included between the first relay terminal and the second terminal, and the first relay terminal is a relay terminal between the first terminal and the second terminal.

In the scenario in which there is only the first relay terminal between the first terminal and the second terminal, the first relay terminal is directly connected to the second terminal, and the link included between the first relay terminal and the second terminal is the link between the first relay terminal and the second terminal, namely, the second link. In this application, two terminals are directly connected, in other words, there is no relay terminal between the two terminals, which may not require assistance of the relay terminal.

The first QoS parameter corresponds to the link included between the first relay terminal and the second terminal. In other words, the first QoS parameter corresponds to the second link. In other words, the first QoS parameter is used to determine a QoS parameter corresponding to the first service on the second link or is used to determine a QoS parameter corresponding to the first service when the first service is transmitted on the second link.

The first QoS parameter may include at least one of the following: a PQI, a flow bit rate, or a link aggregated bit rate. The PQI is a special 5QI, and each PQI value is in a one-to-one correspondence with a PC5 QoS characteristic. The PC5 QoS characteristic may include one or more of the following: a resource type, a priority level, a data packet delay budget, a data packet error rate, a maximum data burst volume, an averaging window, or the like. The flow bit rate includes a guaranteed flow bit rate and a maximum flow bit rate. The resource type includes a GBR, a non-GBR, and the like. The averaging window may be used to calculate a rate corresponding to the GBR, and the data packet delay budget may refer to a delay of a data packet from a terminal A to a terminal B.

Various QoS parameters in this application are similar to parameters included in the first QoS parameter. Details are not described below again.

In some embodiments, the first terminal may further determine a third QoS parameter, where the third QoS parameter is used to determine a QoS parameter corresponding to the first service on the first link or is used to determine a QoS parameter corresponding to the first service when the first service is transmitted on the first link. That is, the first terminal performs step 603.

In this application, the first terminal determines the first QoS parameter and the third QoS parameter in many manners.

In an example, the first terminal may determine the third QoS parameter based on a QoS requirement that can be guaranteed by the first link. The QoS requirement that can be guaranteed by the first link may be understood as QoS that can be guaranteed when the first terminal sends the first service to the first relay terminal through the first link.

In another example, the first terminal may determine the service requirement of the first service, for example, the transmission rate requirement and/or the transmission delay requirement, based on the first service. Further, the first terminal determines the first QoS parameter and the third QoS parameter based on the service requirement of the first service.

In another example, the first terminal may determine a second QoS parameter based on the service requirement of the first service, where the second QoS parameter indicates the QoS requirement of the first service that is sent by the first terminal to the second terminal; and the first terminal determines the first QoS parameter and the third QoS parameter based on the second QoS parameter. In other words, the first terminal may determine an end-to-end QoS requirement between the first terminal and the second terminal based on the service requirement of the first service, and then further determine a QoS requirement between the first terminal and the first relay terminal and a QoS requirement between the first relay terminal and the second terminal.

It should be understood that the end-to-end QoS requirement may be specifically understood as the QoS requirement of the first service when the first terminal (a source terminal) sends the first service to the second terminal (a destination terminal).

In another example, the first terminal determines the first QoS parameter and the third QoS parameter based on the service requirement of the first service and the QoS requirement that can be guaranteed by the first link. The QoS requirement that can be guaranteed by the first link may be understood as QoS that can be guaranteed when the first terminal sends the first service to the first relay terminal through the first link.

For example, if the transmission delay requirement in the service requirement of the first service is 10 ms, and the first terminal determines that a transmission delay that can be guaranteed by the first link is 2 ms, the first terminal allocates remaining 8 ms to a remaining link. In other words, the second QoS parameter indicates that the transmission delay is 10 ms, the third QoS parameter indicates that the transmission delay is 2 ms, and the first QoS parameter indicates that a transmission delay is 8 ms.

For another example, if the transmission rate requirement in the service requirement of the first service is 10 Mbps, a transmission rate in the second QoS parameter is 10 Mbps, a transmission rate in the third QoS parameter is 10 Mbps, and a transmission rate in the first QoS parameter is 10 Mbps.

In another example, the first terminal may determine the first QoS parameter and the third QoS parameter based on the first service and link information. The link information may indicate a link that needs to be used by the first terminal to send the first service to the second terminal.

For example, there is only the first relay terminal between the first terminal and the second terminal, and the link information indicates the first link and the second link that need to be used by the first terminal to send the first service to the second terminal. The first terminal may determine the first QoS parameter and the third QoS parameter, where the third QoS parameter corresponds to the first link, and the first QoS parameter corresponds to the second link.

604: The first terminal sends the first QoS parameter to the first relay terminal.

Correspondingly, the first relay terminal receives the first QoS parameter from the first terminal.

In some embodiments, 605 to 610 may be further performed.

605: The first relay terminal determines an access stratum configuration of a second link based on the first QoS parameter.

Optionally, the first relay terminal may determine whether the second link can meet the QoS requirement indicated by the first QoS parameter. When the second link can meet the QoS requirement indicated by the first QoS parameter, the first relay terminal determines the access stratum configuration of the second link based on the first QoS parameter.

When the second link does not meet the QoS requirement indicated by the first QoS parameter, 606 may be performed: The first relay terminal determines a fourth QoS parameter based on the first QoS parameter, where the fourth QoS parameter is a QoS parameter corresponding to the first service on the second link or a QoS parameter corresponding to the first service when the first service is transmitted on the second link, and the first relay terminal determines the access stratum configuration of the second link based on the fourth QoS parameter.

For example, if the transmission delay in the first QoS parameter is 10 ms, but a transmission delay that can be met by the second link is 6 ms, it can be determined that a transmission delay in the fourth QoS parameter is 6 ms, and other parameters in the fourth QoS parameter may be the same as the parameters in the first QoS parameter.

For another example, if the transmission rate in the first QoS parameter is 10 Mbps, but a transmission rate that can be met by the second link is 8 Mbps, it can be determined that a transmission rate in the fourth QoS parameter is 8 Mbps, and other parameters in the fourth QoS parameter may be the same as the parameters in the first QoS parameter.

In this application, there are many manners in which the first relay terminal determines whether the second link can meet the QoS requirement indicated by the first QoS parameter.

In an example, the first relay terminal may autonomously determine whether the second link meets the QoS requirement indicated by the first QoS parameter. When determining that the second link does not meet the QoS requirement indicated by the first QoS parameter, the first relay terminal may autonomously determine the fourth QoS parameter.

In another example, the first relay terminal may negotiate with the second terminal to determine whether the second link meets the QoS requirement indicated by the first QoS parameter. When determining that the second link does not meet the QoS requirement indicated by the first QoS parameter, the first relay terminal may negotiate with the second terminal to determine the fourth QoS parameter.

In some embodiments, that the first relay terminal determines an access stratum configuration of a second link based on the first QoS parameter or the fourth QoS parameter may be understood as that the first relay terminal determines, based on the first QoS parameter or the fourth QoS parameter corresponding to a QoS flow on the second link, the access stratum configuration corresponding to the QoS flow. In a possible implementation, the first relay terminal generates the QoS flow based on the first QoS parameter or the fourth QoS parameter, and obtains, in a RAN scheduling mode or an autonomous scheduling mode, the access stratum configuration corresponding to a QoS parameter of the QoS flow. For specific information about the access stratum configuration, refer to the foregoing descriptions. Details are not described herein again.

607: The first relay terminal may further feed back the fourth QoS parameter to the first terminal.

Correspondingly, the first terminal receives the fourth QoS parameter from the first relay terminal.

608: The first terminal determines an access stratum configuration of a first link.

In a possible implementation, the first terminal determines the access stratum configuration of the first link based on the foregoing obtained third QoS parameter.

In another possible implementation, the first terminal may determine the third QoS parameter based on the received fourth QoS parameter and the foregoing second QoS parameter, and the first terminal determines the access stratum configuration of the first link based on the obtained third QoS parameter.

In another possible implementation, the first terminal may further update the third QoS parameter based on the received fourth QoS parameter, and determine the access stratum configuration of the first link based on the updated third QoS parameter. Specifically, the first terminal determines a fifth QoS parameter based on the fourth QoS parameter and the third QoS parameter. The fifth QoS parameter is the updated third QoS parameter, and is a QoS parameter corresponding to the first service on the first link.

For example, in the fourth QoS parameter, when some or all of the first QoS parameter is adjusted, the first terminal may reversely adjust the third QoS parameter, to meet the service requirement of the first service. For example, an example in which the first terminal and the second terminal implement D2D communication through the first link and the second link is used. It is assumed that the transmission delay requirement in the service requirement of the first service is 10 ms, the transmission delay indicated by the first QoS parameter is 6 ms, and the transmission delay indicated by the third QoS parameter is 4 ms. The first relay terminal adjusts the first QoS parameter to obtain the fourth QoS parameter, where the transmission delay indicated by the fourth QoS parameter is 7 ms. If possible, the first terminal may adjust the third QoS parameter to obtain the fifth QoS parameter, where a transmission delay indicated by the fifth QoS parameter is 3 ms.

In another possible implementation, the first terminal may alternatively negotiate with the first relay terminal to determine whether the first link can meet the QoS requirement indicated by the third QoS parameter. When the first link can meet the QoS requirement indicated by the third QoS parameter, the first terminal determines the access stratum configuration of the first link based on the third QoS parameter. When the first link does not meet the QoS requirement indicated by the third QoS parameter, the first terminal may negotiate with the first relay terminal to determine a seventh QoS parameter, and the first terminal determines the access stratum configuration of the first link based on the seventh QoS parameter.

In some embodiments, that the first terminal determines the access stratum configuration of the first link based on the third QoS parameter, the fifth QoS parameter, or the seventh QoS parameter may be understood as that the first terminal determines, based on the third QoS parameter, the fifth QoS parameter, or the seventh QoS parameter corresponding to a QoS flow on the first link, the access stratum configuration corresponding to the QoS flow. In a possible implementation, the first terminal generates the QoS flow based on the third QoS parameter, the fifth QoS parameter, or the seventh QoS parameter, and obtains, in a RAN scheduling mode or an autonomous scheduling mode, the access stratum configuration corresponding to a QoS parameter of the QoS flow. For specific information about the access stratum configuration, refer to the foregoing descriptions. Details are not described herein again.

609: The first terminal sends the access stratum configuration of the first link to the first relay terminal.

Optionally, the first terminal may send the access stratum configuration by using a PC5-S message corresponding to the first link.

For example, the PC5-S message may be a link modification request (link modification request) message.

Correspondingly, the first relay terminal receives the access stratum configuration of the first link from the first terminal.

Optionally, after receiving the access stratum configuration of the first link, the first relay terminal may send a link modification response (link modification response) message to the first terminal.

610: The first terminal sends the first service on the access stratum configuration of the first link.

It may be understood that the first terminal sends, on the access stratum configuration of the first link, data corresponding to the first service.

Correspondingly, the first relay terminal receives, from the access stratum configuration of the first link, the data corresponding to the first service.

Optionally, the first terminal maps the data of the first service to the QoS flow according to a QoS rule, then obtains the access stratum configuration based on the QoS flow, and further sends, based on the access stratum configuration, the data corresponding to the first service.

611: The first relay terminal forwards the first service on the access stratum configuration of the second link.

It may be understood that the first relay terminal forwards, on the access stratum configuration of the second link, the data corresponding to the first service.

Correspondingly, the second terminal receives, from the access stratum configuration of the second link, the data corresponding to the first service.

Optionally, the first relay terminal may generate and store a correspondence between the first link and the second link, and a correspondence between the access stratum configuration of the first link and the access stratum configuration of the second link; and the first relay terminal forwards, based on the obtained correspondences, the data corresponding to the first service. Specifically, the first relay terminal determines, based on the correspondence between the first link and the second link, to forward the data that corresponds to the first service and that is received on the first link to the second link, and then determines, based on the correspondence between the access stratum configuration of the first link and the access stratum configuration of the second link, to send, on the access stratum configuration of the second link, the data that corresponds to the first service and that is received on the access stratum configuration of the first link.

Some steps in this embodiment of this application may be the same as some steps in the link establishment procedure in the relay scenario shown in FIG. 5. For example, step 604 may be the same as step 504 in FIG. 5, and step 607 may be the same as step 506 in FIG. 5. Certainly, the communication method shown in FIG. 6 may alternatively be a separate procedure. For example, steps are performed after the link establishment procedure in the relay scenario is completed.

(2) The first relay terminal allocates the QoS parameters.

Figure 7:
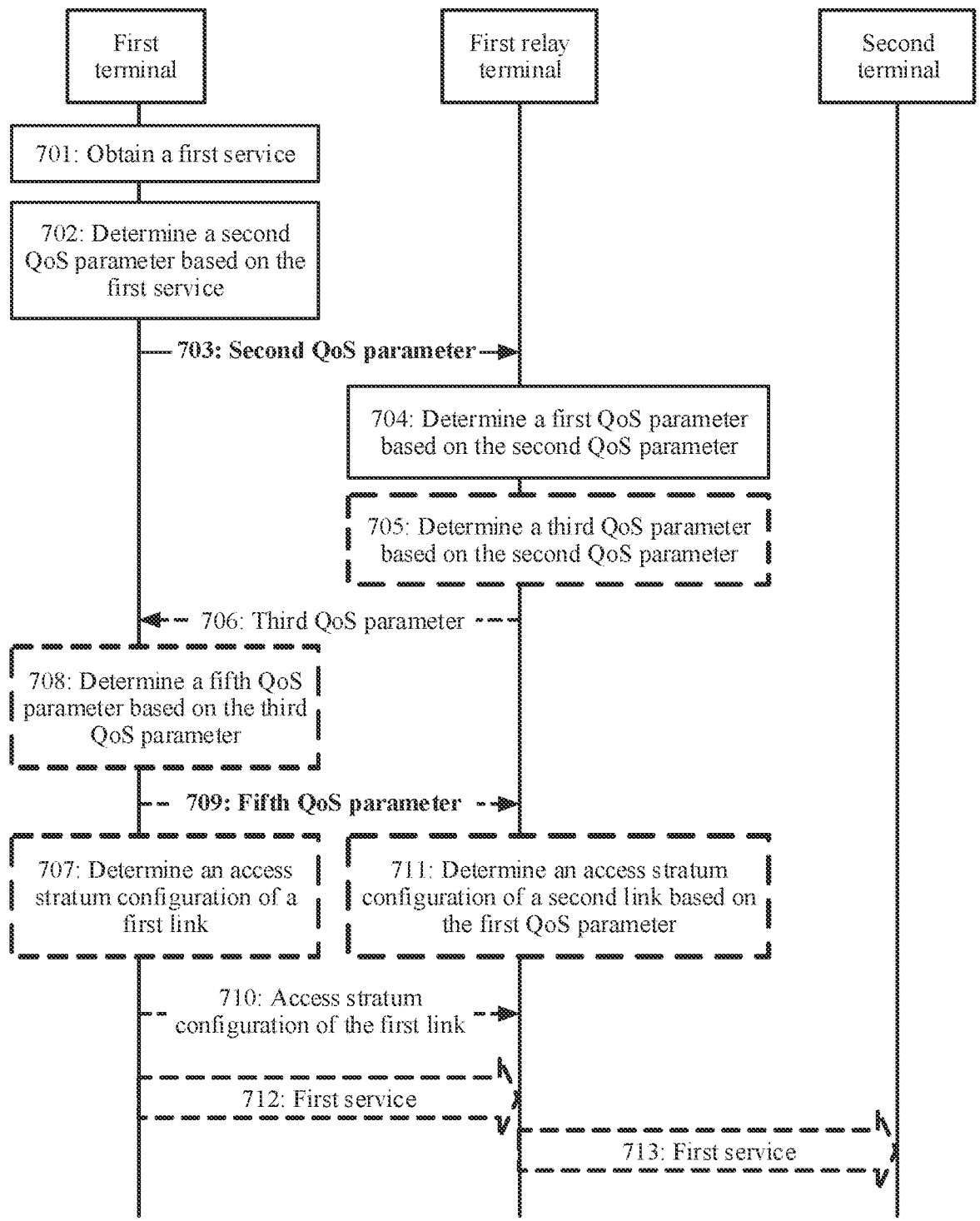
FIG. 7 is a schematic flowchart of another communication method according to this application.

FIG. 7 is a schematic flowchart of another communication method according to this application. A scenario of the method shown in FIG. 7 is similar to that of the method shown in FIG. 6. Details are not described again.

701: The first terminal obtains a first service.

Step 701 is similar to step 601. Details are not described herein again.

702: The first terminal determines a second QoS parameter based on the first service, where the second QoS parameter indicates a QoS requirement of the first service that is sent by the first terminal to the second terminal.

703: The first terminal sends the second QoS parameter to the first relay terminal.

Correspondingly, the first relay terminal receives the second QoS parameter from the first terminal.

To be specific, the first terminal sends an end-to-end QoS requirement of the first service to the first relay terminal, so that the first relay terminal allocates the QoS parameters.

Optionally, the first terminal may alternatively send a service type and/or service requirement information to the first relay terminal, and the first relay terminal then determines the second QoS parameter based on the service type and/or the service requirement information.

704: The first relay terminal determines a first QoS parameter based on the second QoS parameter. The first QoS parameter corresponds to the link included between the first relay terminal and the second terminal, and the first relay terminal is a relay terminal between the first terminal and the second terminal.

The first QoS parameter in FIG. 7 is similar to the QoS parameter in FIG. 6. Details are not described again.

In some embodiments, the first relay terminal may further perform steps 705 and 706. To be specific, the first relay terminal determines and sends a QoS parameter corresponding to the first service on a first link.

705: The first relay terminal determines a third QoS parameter, where the third QoS parameter is used to determine a QoS parameter corresponding to the first service on a first link or is used to determine a QoS parameter corresponding to the first service when the first service is transmitted on a first link.

706: The first relay terminal sends the third QoS parameter to the first terminal.

Correspondingly, the first terminal receives the third QoS parameter from the first relay terminal.

In this application, the first relay terminal determines the first QoS parameter and the third QoS parameter in many manners.

In an example, the first relay terminal determines the first QoS parameter and the third QoS parameter based on the second QoS parameter and a QoS requirement that can be guaranteed by the second link. The QoS requirement that can be guaranteed by the second link may be understood as QoS that can be guaranteed when the first relay terminal sends the first service to the second terminal through the second link.

For example, if a transmission delay requirement in the service requirement of the first service is 10 ms, and the first relay terminal determines that a transmission delay that can be guaranteed by the second link is 2 ms, the first relay terminal allocates remaining 8 ms to a remaining link. In other words, the second QoS parameter indicates that a transmission delay is 10 ms, the third QoS parameter indicates that the transmission delay is 2 ms, and the first QoS parameter indicates that a transmission delay is 8 ms.

For another example, if a transmission rate requirement in the service requirement of the first service is 10 Mbps, a transmission rate in the first QoS parameter is 10 Mbps, a transmission rate in the third QoS parameter is 10 Mbps, and a transmission rate in the first QoS parameter is 10 Mbps.

In another example, the first relay terminal may determine the first QoS parameter and the third QoS parameter based on the second QoS parameter and link information. The link information may indicate a link that needs to be used by the first terminal to send the first service to the second terminal.

For example, there is only the first relay terminal between the first terminal and the second terminal, and the link information indicates the first link and the second link that need to be used by the first terminal to send the first service to the second terminal. The first relay terminal may determine the first QoS parameter and the third QoS parameter, where the third QoS parameter corresponds to the first link, and the first QoS parameter corresponds to the second link.

In some embodiments, 707 to 713 may be further performed.

707: The first terminal determines an access stratum configuration of a first link.

In a possible implementation, the first terminal determines the access stratum configuration of the first link based on the received third QoS parameter.

In another possible implementation, the first terminal may determine whether the first link can meet a QoS requirement indicated by the third QoS parameter. When the first link can meet the QoS requirement indicated by the third QoS parameter, the first terminal determines the access stratum configuration of the first link based on the third QoS parameter.

When the first link does not meet the QoS requirement indicated by the third QoS parameter, step 708 may be performed: The first terminal determines a fifth QoS parameter based on the third QoS parameter, where the fifth QoS parameter is a QoS parameter corresponding to the first service on the first link or a QoS parameter corresponding to the first service when the first service is transmitted on the first link, and the first terminal determines the access stratum configuration of the first link based on the fifth QoS parameter.

For example, if the transmission delay in the third QoS parameter is 10 ms, but a transmission delay that can be met by the first link is 6 ms, a transmission delay in the fifth QoS parameter may be determined as 6 ms, and other parameters in the fifth QoS parameter may be the same as the parameters in the third QoS parameter.

For another example, if the transmission rate in the third QoS parameter is 10 Mbps, but a transmission rate that can be met by the first link is 8 Mbps, it can be determined that a transmission rate in the fifth QoS parameter is 8 Mbps, and other parameters in the fifth QoS parameter may be the same as the parameters in the first QoS parameter.

In this application, there are many manners in which the first terminal determines whether the first link can meet the QoS requirement indicated by the third QoS parameter.

In an example, the first terminal may autonomously determine whether the first link meets the QoS requirement indicated by the third QoS parameter. When determining that the first link does not meet the QoS requirement indicated by the third QoS parameter, the first terminal may autonomously determine the fifth QoS parameter.

Optionally, the first terminal may negotiate with the first relay terminal to determine whether the first link meets the QoS requirement indicated by the third QoS parameter. When determining that the first link does not meet the QoS requirement indicated by the third QoS parameter, the first terminal may negotiate with the first relay terminal to determine the fifth QoS parameter.

In some embodiments, that the first terminal determines the access stratum configuration of the first link based on the third QoS parameter or the fifth QoS parameter may be understood as that the first terminal determines, based on the third QoS parameter or the fifth QoS parameter corresponding to a QoS flow on the first link, the access stratum configuration corresponding to the QoS flow. In a possible implementation, the first terminal generates the QoS flow based on the third QoS parameter or the fifth QoS parameter, and obtains, in a RAN scheduling mode or an autonomous scheduling mode, the access stratum configuration corresponding to a QoS parameter of the QoS flow. For specific information about the access stratum configuration, refer to the foregoing descriptions. Details are not described herein again.

In some embodiments, step 709 may be further performed. To be specific, the first terminal may further feed back the fifth QoS parameter to the first relay terminal, so that the first relay terminal adjusts the QoS parameters.

709: The first terminal sends the fifth QoS parameter to the first relay terminal.

Correspondingly, the first relay terminal receives the fifth QoS parameter from the first terminal.

710: The first terminal may send the access stratum configuration of the first link to the first relay terminal.

Step 710 is similar to step 609. Details are not described herein again.

711: The first relay terminal determines an access stratum configuration of a second link based on the first QoS parameter.

In a possible implementation, the first relay terminal may determine the access stratum configuration of the second link by using the foregoing obtained first QoS parameter.

In another possible implementation, the first relay terminal may further update the first QoS parameter based on the received fifth QoS parameter, and determine the access stratum configuration of the first link based on the updated first QoS parameter. Specifically, the first terminal determines a fourth QoS parameter based on the first QoS parameter and the fifth QoS parameter. The fourth QoS parameter is the updated first QoS parameter, and is a QoS parameter corresponding to the first service on the second link or a QoS parameter corresponding to the first service when the first service is transmitted on the first link.

For example, in the fifth QoS parameter, when some or all of the third QoS parameter is adjusted, the first relay terminal may reversely adjust the first QoS parameter, to meet the service requirement of the first service. For example, an example in which the first terminal and the second terminal implement D2D communication through the first link and the second link is used. It is assumed that the transmission delay requirement in the service requirement of the first service is 10 ms, the transmission delay indicated by the first QoS parameter is 6 ms, and the transmission delay indicated by the third QoS parameter is 4 ms. The first terminal adjusts the third QoS parameter to obtain the fifth QoS parameter, where the transmission delay indicated by the fifth QoS parameter is 7 ms. If possible, the first relay terminal may adjust the first QoS parameter to obtain the fourth QoS parameter, where a transmission delay indicated by the fourth QoS parameter is 3 ms.

In another possible implementation, the first relay terminal may alternatively negotiate with the second terminal to determine whether the second link can meet the QoS requirement indicated by the first QoS parameter. When the second link can meet the QoS requirement indicated by the first QoS parameter, the first relay terminal determines the access stratum configuration of the second link based on the first QoS parameter. When the second link does not meet the QoS requirement indicated by the first QoS parameter, the first relay terminal may negotiate with the second terminal to determine the fourth QoS parameter, and the first relay terminal determines the access stratum configuration of the second link based on the fourth QoS parameter.

In some embodiments, that the first relay terminal determines an access stratum configuration of a second link based on the first QoS parameter or the fourth QoS parameter may be understood as that the first relay terminal determines, based on the first QoS parameter or the fourth QoS parameter corresponding to a QoS flow on the second link, the access stratum configuration corresponding to the QoS flow. In a possible implementation, the first relay terminal generates the QoS flow based on the first QoS parameter or the fourth QoS parameter, and obtains, in a RAN scheduling mode or an autonomous scheduling mode, the access stratum configuration corresponding to a QoS parameter of the QoS flow. For specific information about the access stratum configuration, refer to the foregoing descriptions. Details are not described herein again.

712: The first terminal sends the first service on the access stratum configuration of the first link.

713: The first relay terminal forwards the first service on the access stratum configuration of the second link.

Step 712 is similar to step 610, and step 713 is similar to step 611. Details are not described herein again.

Some steps in this embodiment of this application may be the same as some steps in the link establishment procedure in the relay scenario shown in FIG. 5. For example, step 703 may be the same as step 504c in FIG. 5, and step 706 may be the same as step 506 in FIG. 5. Certainly, the communication method shown in FIG. 7 may alternatively be a separate procedure. For example, steps are performed after the link establishment procedure in the relay scenario is completed.

(3) The access network device determines an access stratum configuration of each link.

Figure 8:
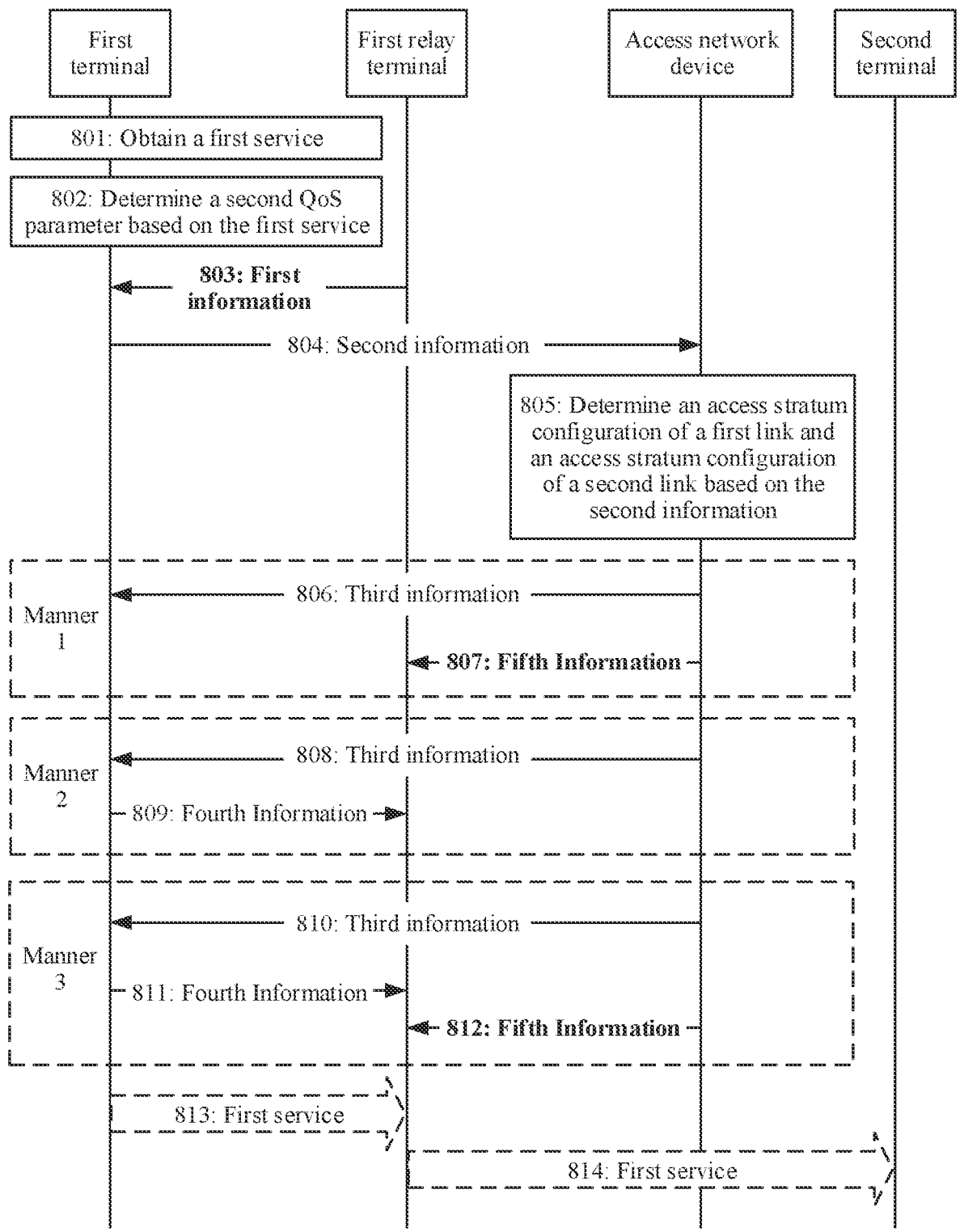
FIG. 8 is a schematic flowchart of another communication method according to this application.

FIG. 8 is a schematic flowchart of another communication method according to this application. The method shown in FIG. 8 may be performed by a first terminal, a first relay terminal, a second terminal, and an access network device, or may be performed by chips or modules in a first terminal, a first relay terminal, a second terminal, and an access network device. In FIG. 8, the communication method in this embodiment of this application is described by using an example in which the first terminal, the first relay terminal, the second terminal, and the access network device are execution bodies. The method shown in FIG. 8 may include at least a part of the following content.

For steps 801 and 802, refer to related descriptions of steps 701 and 702. Details are not described herein again.

803: The first relay terminal sends first information to the first terminal.

Correspondingly, the first terminal receives the first information from the first relay terminal. The first information includes information about a second link.

Optionally, the first relay terminal may send the first information by using a PC5-S message corresponding to a first link.

For example, the PC5-S message may be a link modification request message.

Optionally, the information about the link may be at least one of an identifier of the link or a target layer 2 identifier of the link. Optionally, the identifier of the link may be a PC5 link identifier (PC5 link identifier).

In some embodiments, the first information may further include information about the first relay terminal, so that the access network device sends the information to the first relay terminal.

Optionally, the information about the first relay terminal may be at least one of an identifier of the first relay terminal or a cell radio network temporary identifier (cell access radio network temporary identifier, C-RNTI).

A sequence of step 803, step 801, and step 802, a sequence of step 801 and steps 502 to 506 in FIG. 5, and a sequence of step 802 and steps 502 to 506 in FIG. 5 are not limited in this embodiment of this application.

804: The first terminal sends second information to the access network device.

Correspondingly, the access network device receives the second information from the first terminal.

Optionally, the first terminal may send the second information by using an RRC message. For example, the RRC message may be a sidelink terminal information message (sidelink UE information message).

The second information includes the second QoS parameter, the information about the first link, and the information about the second link.

In some embodiments, when the first information includes the information about the first relay terminal, the second information may include the information about the first relay terminal, so that the access network device sends the information to the first relay terminal.

Optionally, step 804 may be performed after step 506 in FIG. 5, and step 803 is performed before step 804.

805: After receiving the second information, the access network device determines an access stratum configuration of a first link and an access stratum configuration of a second link.

In an example, the access network device determines the access stratum configuration of the first link and the access stratum configuration of the second link based on the second QoS parameter.

For example, if a transmission delay requirement in the second QoS parameter is 10 ms, the access network device determines the access stratum configuration of the first link and the access stratum configuration of the second link to meet the transmission delay requirement. The access stratum configuration of the first link can meet that a transmission delay is 6 ms, and the access stratum configuration of the second link can meet that a transmission delay is 4 ms.

For another example, if a transmission rate in the second QoS parameter is 10 Mbps, the access network device determines the access stratum configuration of the first link and the access stratum configuration of the second link to meet the transmission rate requirement. The access stratum configuration of the first link may meet that a transmission rate is 10 Mbps, and the access stratum configuration of the second link may meet that a transmission rate is 10 Mbps.

Then, the access network device may send the determined access stratum configuration of the first link and the determined access stratum configuration of the second link to the first terminal and the first relay terminal.

There are many manners in which the access network device sends the access stratum configuration of the first link and the access stratum configuration of the second link. For example, the access network device may send the access stratum configuration of the first link and the access stratum configuration of the second link in the following manners 1 to 3.

Manner 1 is shown in 806 and 807.

806: The access network device sends third information to the first terminal.

Correspondingly, the first terminal receives the third information from the access network device.

Optionally, the access network device may send the third information by using an RRC message. For example, the RRC message may be an RRC reconfiguration message (RRC Reconfiguration message).

The third information includes the access stratum configuration of the first link and the information about the first link.

Optionally, the third information may further include the access stratum configuration of the second link and the information about the second link.

807: The access network device sends fifth information to the first relay terminal.

Correspondingly, the first relay terminal receives the fifth information from the access network device.

Optionally, the access network device may send the fifth information by using an RRC message. For example, the RRC message may be an RRC reconfiguration message.

The fifth information includes the access stratum configuration of the first link, the access stratum configuration of the second link, and at least one of the information about the first link and the information about the second link.

After a relay link is established, in other words, link mapping is completed, the first relay terminal stores a correspondence between the information about the first link and the information about the second link. Therefore, the fifth information only needs to include at least one of the information about the first link or the information about the second link.

Manner 2 is shown in 808 and 809.

808: The access network device sends third information to the first terminal.

Correspondingly, the first terminal receives the third information from the access network device.

The third information includes the access stratum configuration of the first link, the information about the first link, the access stratum configuration of the second link, and the information about the second link.

Optionally, the access network device may send the third information by using an RRC message. For example, the RRC message may be an RRC reconfiguration message.

809: The first terminal sends fourth information to the first relay terminal.

Correspondingly, the first relay terminal receives the fourth information from the first terminal.

The fourth information includes the access stratum configuration of the first link, the access stratum configuration of the second link, and the information about the second link.

Optionally, the fourth information further includes the information about the first link.

Manner 3 is shown in 810 to 812.

810: The access network device sends third information to the first terminal.

Correspondingly, the first terminal receives the third information from the access network device.

The third information includes the access stratum configuration of the first link and the information about the first link.

Optionally, the access network device may send the third information by using an RRC message. For example, the RRC message may be an RRC reconfiguration message.

Optionally, the third information further includes the access stratum configuration of the second link and the information about the second link.

811: The first terminal sends fourth information to the first relay terminal.

Correspondingly, the first relay terminal receives the fourth information from the first terminal.

The fourth information includes the access stratum configuration of the first link.

Optionally, the fourth information further includes the information about the first link.

812: The access network device sends the fifth information to the first relay terminal.

Correspondingly, the first relay terminal receives the fifth information from the access network device.

The fifth information includes the information about the second link and the access stratum configuration of the second link.

Optionally, the access network device may send the fifth information by using an RRC message. For example, the RRC message may be an RRC reconfiguration message.

After the access stratum configuration is negotiated, the first terminal may perform 813, in other words, the first terminal sends the first service.

Specifically, the first terminal sends the first service based on the access stratum configuration of the first link.

814: The first relay terminal forwards the first service based on the access stratum configuration of the second link.

Step 813 is similar to step 610, and step 814 is similar to step 611. Details are not described herein again.

Some steps in this embodiment of this application may be the same as some steps in the link establishment procedure in the relay scenario shown in FIG. 5. Certainly, the communication method shown in FIG. 8 may alternatively be a separate procedure. For example, steps are performed after the link establishment procedure in the relay scenario is completed.

Scenario 2: There are a plurality of relay terminals between the first terminal and the second terminal.

When there are the plurality of relay terminals between the first terminal and the second terminal, at least one relay terminal may be included between the first relay terminal and the second terminal. In this way, at least two links are included between the first relay terminal and the second terminal.

For example, a first relay terminal, a second relay terminal, and a third relay terminal are included between the first terminal and the second terminal, the first relay terminal is directly connected to the first terminal and the second relay terminal, the second relay terminal is directly connected to the first relay terminal and the third relay terminal, and the third relay terminal is directly connected to the second relay terminal and the second terminal. In this way, the second relay terminal and the third relay terminal are included between the first relay terminal and the second terminal. A link between the first relay terminal and the second relay terminal, a link between the second relay terminal and the third relay terminal, and a link between the third relay terminal and the second terminal are included between the first relay terminal and the second terminal.

(1) The first terminal allocates the QoS parameters.

Manner A: The first terminal may allocate a QoS parameter to each link, so that all links as a whole can meet the QoS requirement of the first service. In this case, the first QoS parameter corresponds to the second link.

For example, it is assumed that there are N relay terminals between the first terminal and the second terminal, and N is an integer greater than 1. The first terminal may divide the service requirement of the first service into (N+1) parts, and separately allocate the (N+1) parts to (N+1) links. Each part of the service requirement may be represented by a QoS parameter. For example, a service requirement corresponding to the first link may be represented by a third QoS parameter, and a service requirement corresponding to the second link may be represented by a first QoS parameter.

Manner B: The first terminal may divide the service requirement of the first service into two parts, where a first part is allocated to the first link, and a second part is allocated to all subsequent links and is indicated to the first relay terminal. The first relay terminal then further divides the second part of the service requirement into two parts, where a first part is allocated to the second link, and a second part is allocated to all subsequent links. The rest may be deduced by analogy.

For example, it is assumed that the first relay terminal and the second relay terminal are included between the first terminal and the second terminal. The first terminal determines a first QoS parameter and a third QoS parameter, where the third QoS parameter corresponds to the first link, the first QoS parameter corresponds to the second link and a third link, and the third link is a link between the second relay terminal and the second terminal. The first relay terminal further determines a fourth QoS parameter and a sixth QoS parameter based on the first QoS parameter, where the fourth QoS parameter corresponds to the second link, and the sixth QoS parameter corresponds to the third link.

The following describes the technical solutions of this application by using an example in which the first relay terminal and the second relay terminal are included between the first terminal and the second terminal.

For ease of description, in the following, a link between the first terminal and the first relay terminal is referred to as a first link, a link between the first relay terminal and the second relay terminal is referred to as a second link, and a link between the second relay terminal and the second terminal is referred to as a third link.

Figure 9A:
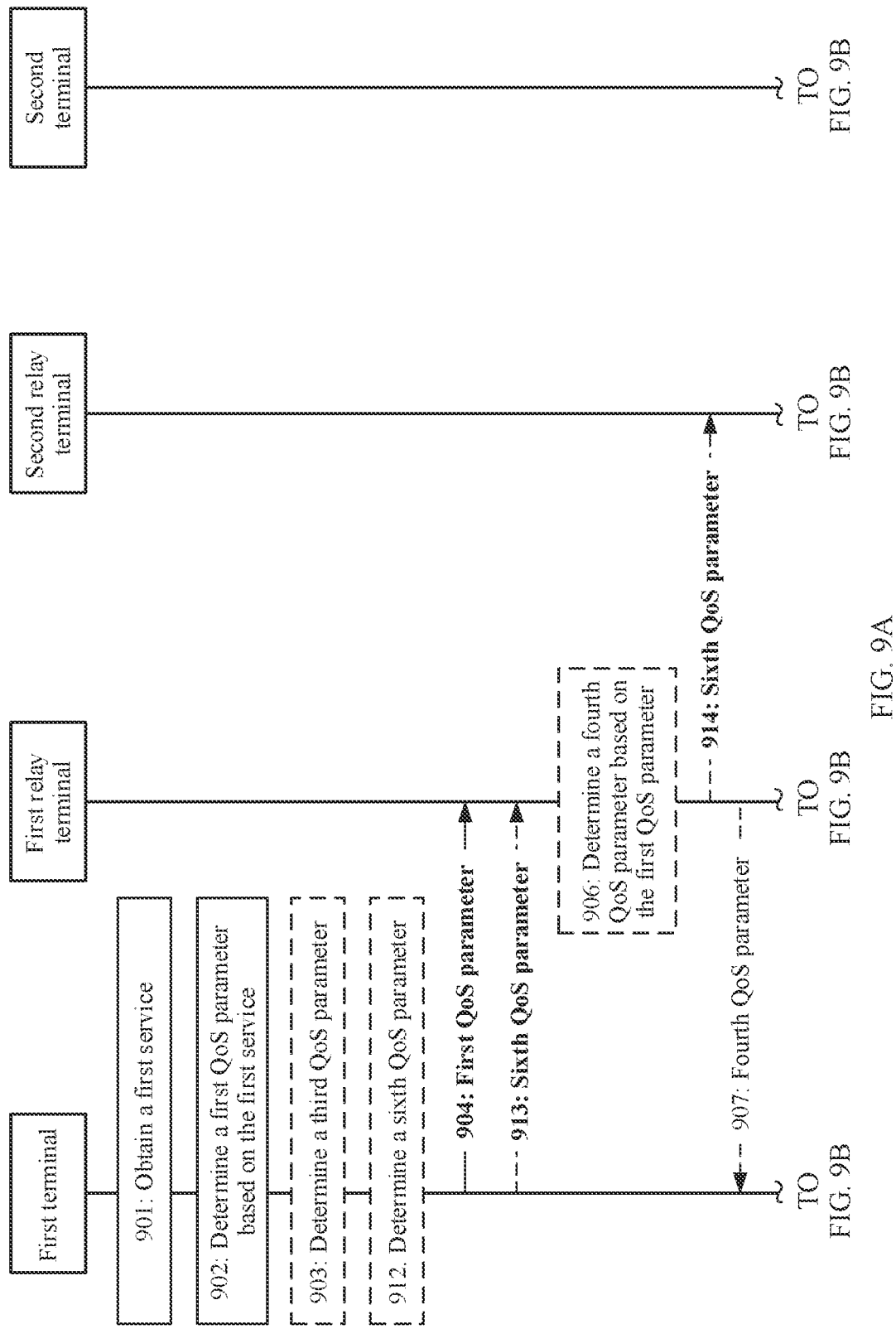
Figure 9B:
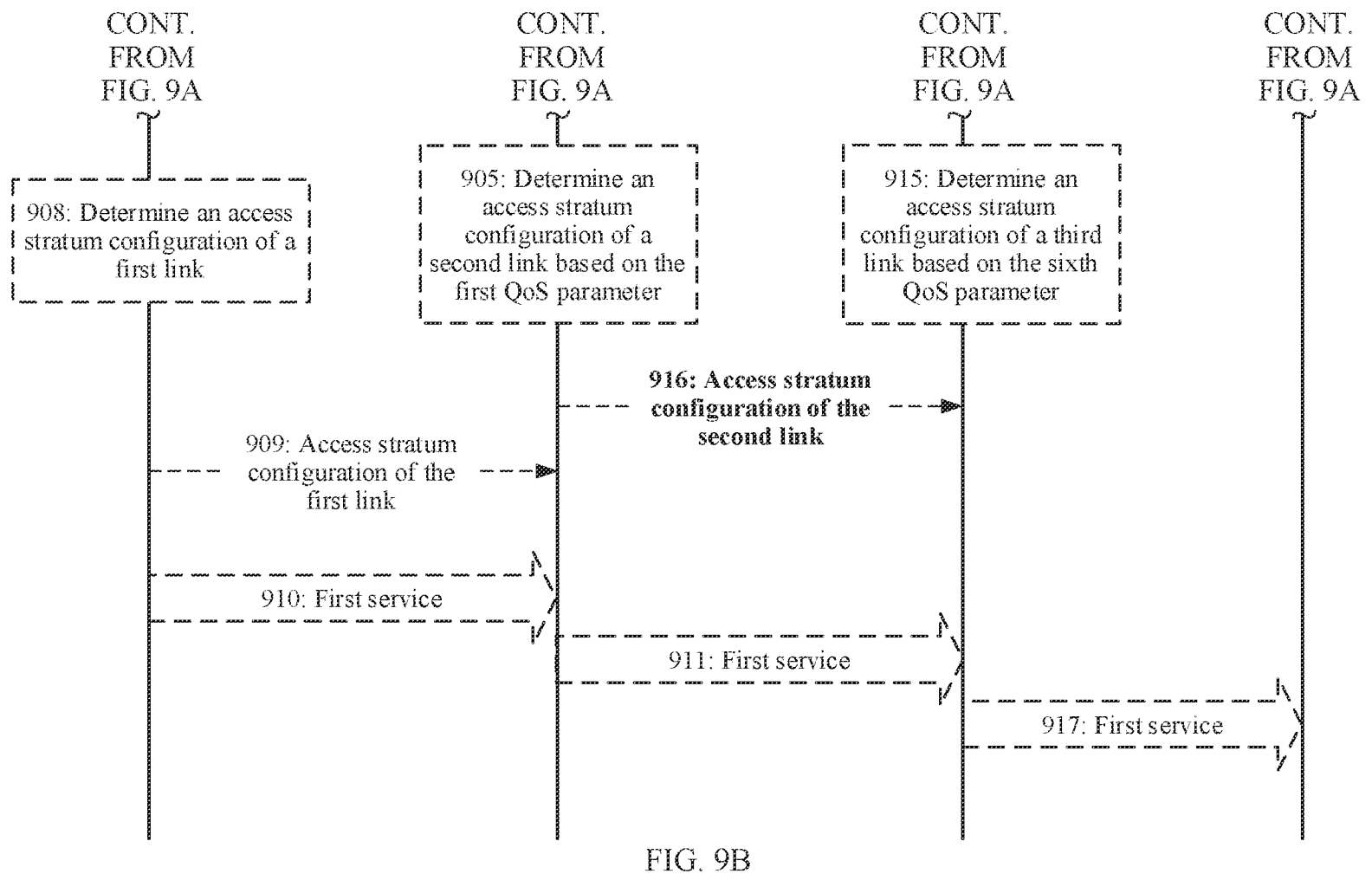

FIG. 9A and FIG. 9B are a schematic flowchart of another communication method according to this application. The method shown in FIG. 9A and FIG. 9B corresponds to the foregoing manner A. The method shown in FIG. 9A and FIG. 9B may be performed by the first terminal, the first relay terminal, the second relay terminal, and the second terminal, or may be performed by a chip or a module in the first terminal, the first relay terminal, the second relay terminal, and the second terminal. In FIG. 9A and FIG. 9B, the communication method in this embodiment of this application is described by using an example in which the first terminal, the first relay terminal, the second relay terminal, and the second terminal are execution bodies. The method shown in FIG. 9A and FIG. 9B may include at least a part of the following content.

For steps 901 to 911, refer to steps 601 to 611 in FIG. 6. Details are not described herein again.

Based on FIG. 6, the first terminal may further perform steps 912 to 917.

912: The first terminal determines a sixth QoS parameter, where the sixth QoS parameter is used to determine a QoS parameter corresponding to the first service on the third link or is used to determine a QoS parameter corresponding to the first service when the first service is transmitted on the third link.

913: The first terminal sends the sixth QoS parameter to the first relay terminal.

Correspondingly, the first relay terminal receives the sixth QoS parameter from the first terminal.

Optionally, the first QoS parameter and the sixth QoS parameter may be sent to the first relay terminal in a same message.

914: The first relay terminal forwards the sixth QoS parameter to the second relay terminal.

Correspondingly, the second relay terminal receives the QoS parameter from the first relay terminal.

915: The second relay terminal determines an access stratum configuration of the third link based on the sixth QoS parameter.

A specific implementation is similar to that in which the first relay terminal determines the access stratum configuration of the second link. For details, refer to related descriptions of step 605. Details are not described herein again.

916. The first relay terminal sends the access stratum configuration of the second link to the second relay terminal.

Optionally, the first relay terminal may send the access stratum configuration by using a PC5-S message corresponding to the second link.

For example, the PC5-S message may be a link modification request message.

Correspondingly, the second relay terminal receives the access stratum configuration of the first link from the first relay terminal.

Optionally, after receiving the access stratum configuration of the first link, the second relay terminal may send a link modification response message to the first relay terminal.

917: After receiving the first service on the access stratum configuration of the second link, the second relay terminal forwards the first service to the second terminal on the access stratum configuration of the third link.

It may be understood that the second relay terminal forwards, on the access stratum configuration of the third link, data corresponding to the first service.

Correspondingly, the second terminal receives, from the access stratum configuration of the third link, the data corresponding to the first service.

Optionally, the second relay terminal may generate and store a correspondence between the second link and the third link, and a correspondence between the access stratum configuration of the second link and the access stratum configuration of the third link; and the second relay terminal forwards, based on the obtained correspondences, the data corresponding to the first service. Specifically, the second relay terminal determines, based on the correspondence between the second link and the third link, to forward the data that corresponds to the first service and that is received on the second link to the third link, and then determines, based on the correspondence between the access stratum configuration of the second link and the access stratum configuration of the third link, to send, on the access stratum configuration of the third link, the data that corresponds to the first service and that is received on the access stratum configuration of the second link.

It should be noted that a sequence of the steps is not limited in this embodiment of this application. For example, for step 914 and step 907, step 914 may be performed before step 907, or step 907 may be performed before step 914, or step 914 and step 907 may be simultaneously performed.

Figure 10A:
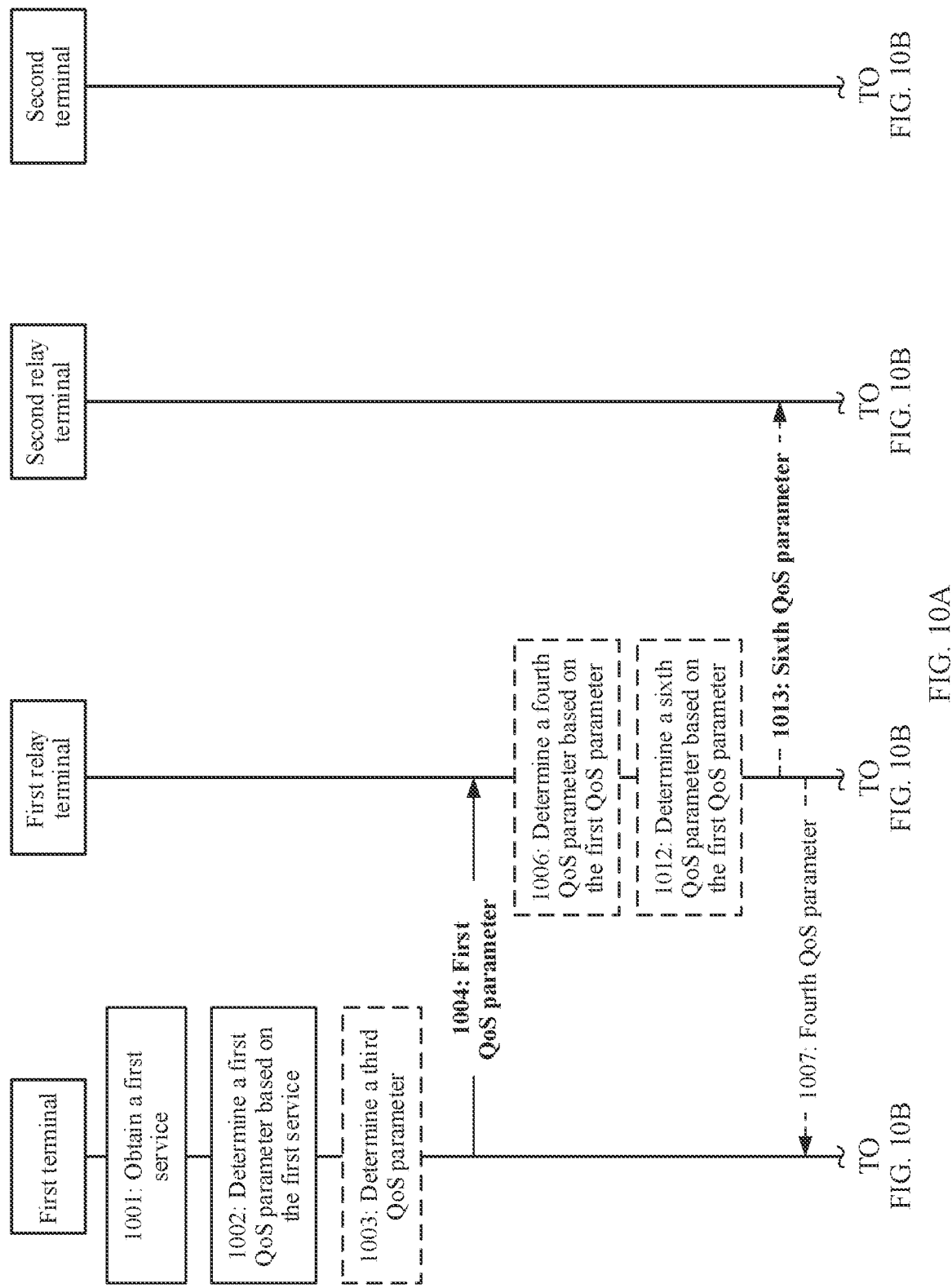
FIG. 10A and FIG. 10B are a schematic flowchart of another communication method according to this application.
Figure 10B:
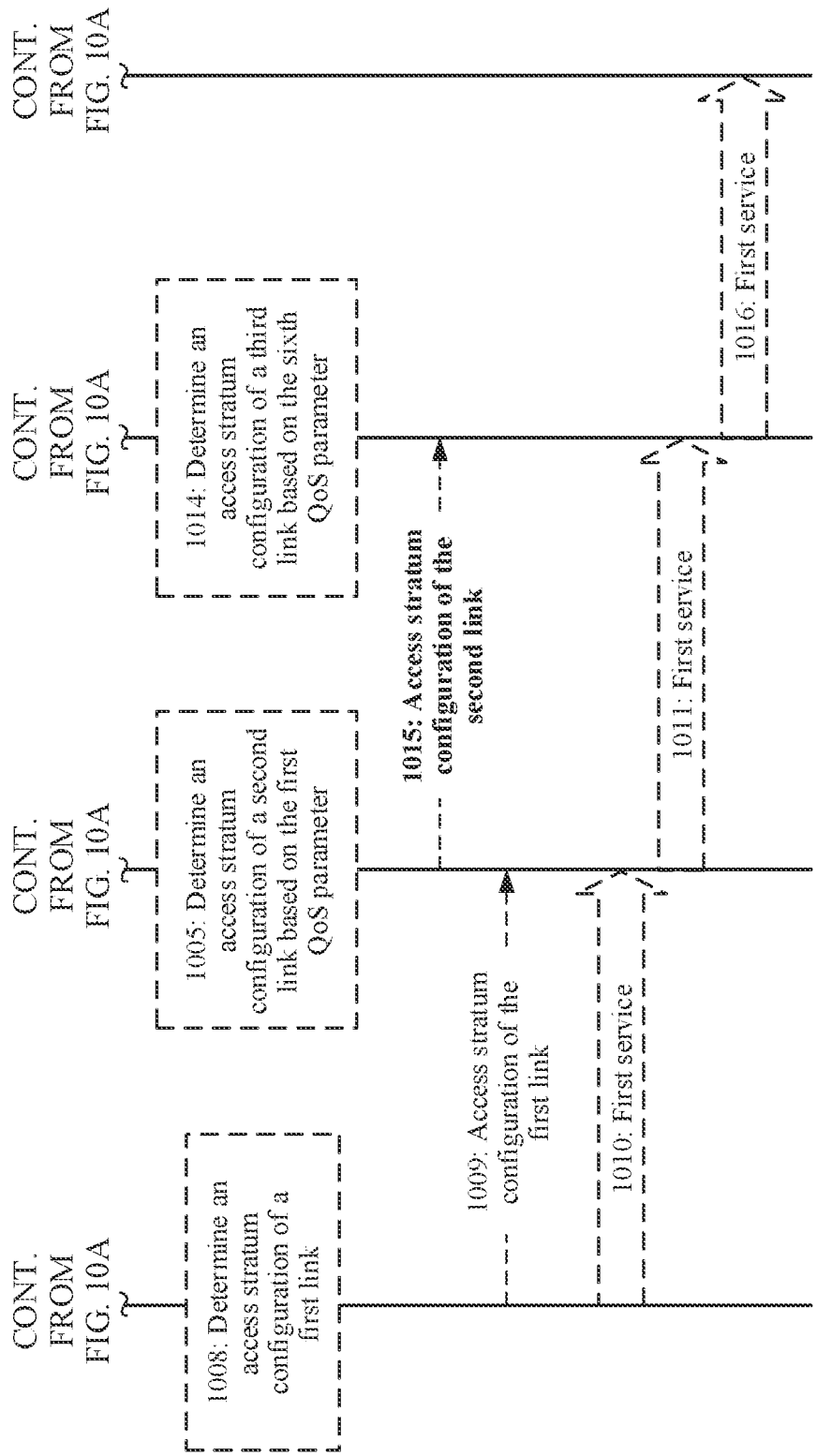

FIG. 10A and FIG. 10B are a schematic flowchart of another communication method according to this application. The method shown in FIG. 10A and FIG. 10B corresponds to the foregoing manner B. In FIG. 9A and FIG. 9B, the first terminal determines the sixth QoS parameter, and sends the sixth QoS parameter to the first relay terminal, and the first relay terminal then forwards the sixth QoS parameter to the second relay terminal. Different from FIG. 9A and FIG. 9B, in FIG. 10A and FIG. 10B, the first QoS parameter corresponds to the second link and the third link, and the first relay terminal needs to determine a sixth QoS parameter based on the received first QoS parameter, and send the sixth QoS parameter to the second relay terminal. For descriptions of other steps, refer to FIG. 9A and FIG. 9B. Details are not described herein again.

(2) The first relay terminal allocates the QoS parameters.

Manner C: The first relay terminal may allocate a QoS parameter to each link, so that all links as a whole can meet the QoS requirement of the first service. In this case, the first QoS parameter corresponds to the second link. Manner C is similar to the foregoing manner A. Details are not described herein again.

Manner D. The first relay terminal may divide the service requirement of the first service into two parts, where a first part is allocated to the first link, and a second part is allocated to all subsequent links. Further, the first relay terminal then further divides the second part of the service requirement into two parts, where a first part is allocated to the second link, and a second part is allocated to all subsequent links. The rest may be deduced by analogy. Manner D is similar to Manner B, and a difference lies in that the first relay terminal first allocates the QoS parameter.

The following describes the technical solutions of this application by using an example in which the first relay terminal and the second relay terminal are included between the first terminal and the second terminal. For ease of description, in the following, a link between the first terminal and the first relay terminal is referred to as a first link, a link between the first relay terminal and the second relay terminal is referred to as a second link, and a link between the second relay terminal and the second terminal is referred to as a third link.

Figure 11B:
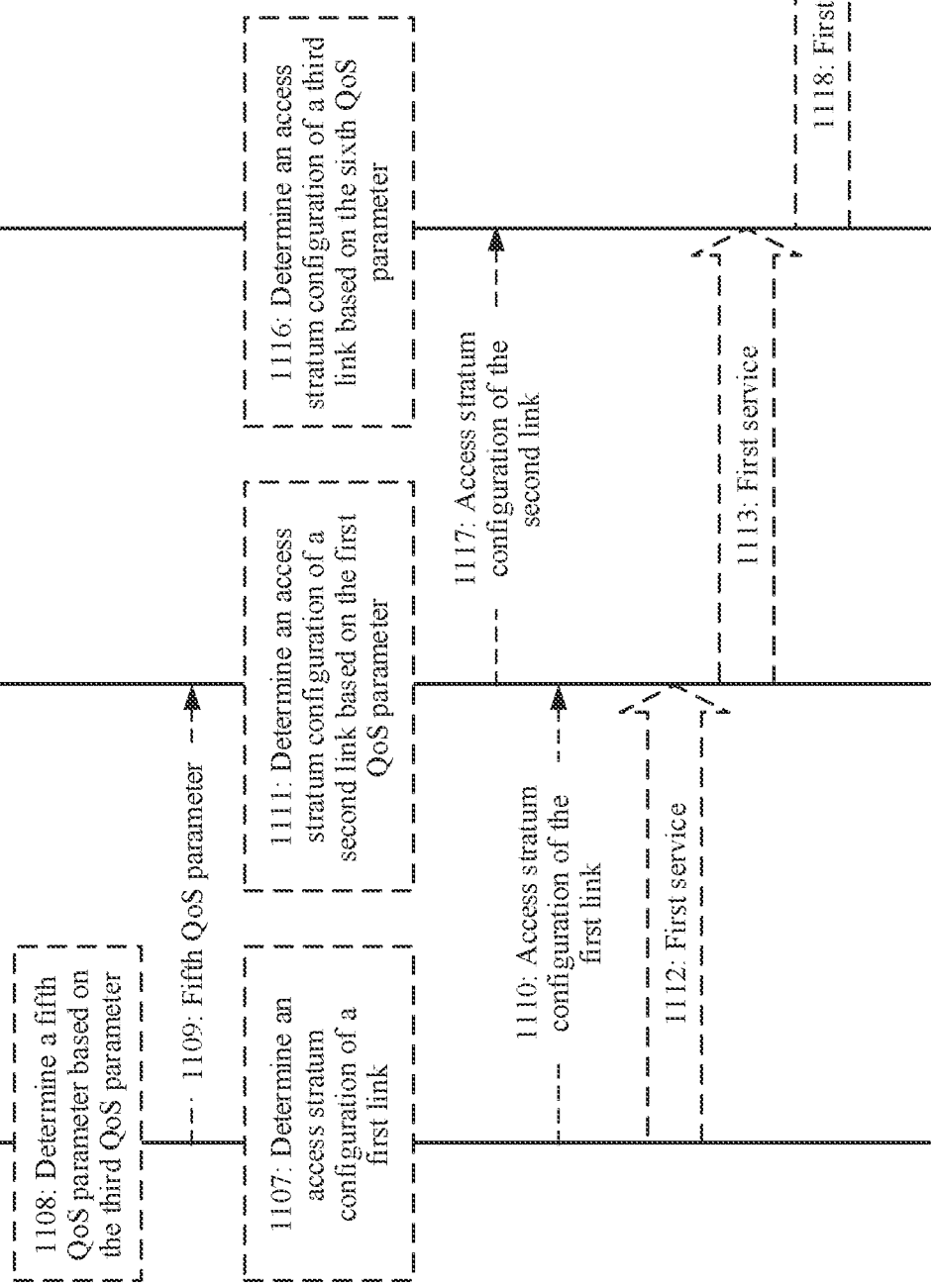

FIG. 11A and FIG. 11B are a schematic flowchart of another communication method according to this application. The method shown in FIG. 11A and FIG. 11B corresponds to the foregoing manner D. A scenario of the method shown in FIG. 11A and FIG. 11B is similar to that of the method shown in FIG. 9A and FIG. 9B. Details are not described again.

For steps 1101 to 1113, refer to steps 701 to 713 in FIG. 7. Details are not described herein again.

Based on FIG. 7, the first terminal may further perform steps 1114 to 1118.

1114: The first relay terminal determines a fourth QoS parameter and a sixth QoS parameter, where the fourth QoS parameter is used to determine a QoS parameter corresponding to the first service on the second link or is used to determine a QoS parameter corresponding to the first service when the first service is transmitted on the second link, and the sixth QoS parameter is used to determine a QoS parameter corresponding to the first service on the third link or is used to determine a QoS parameter corresponding to the first service when the first service is transmitted on the third link. Correspondingly, in step 1111, that the first relay terminal determines an access stratum configuration of a second link based on the first QoS parameter includes: The first relay terminal determines a fourth QoS parameter based on the first QoS parameter, and determines the access stratum configuration of the second link based on the fourth QoS parameter.

1115: The first relay terminal sends the sixth QoS parameter to the second relay terminal.

Correspondingly, the second relay terminal receives the sixth QoS parameter from the first relay terminal.

1116: The second relay terminal determines an access stratum configuration of the third link based on the sixth QoS parameter.

A specific implementation is similar to that in which the first relay terminal determines the access stratum configuration of the second link. For details, refer to related descriptions of step 711. Details are not described herein again.

1117: The first relay terminal sends the access stratum configuration of the second link to the second relay terminal.

1118: After receiving the first service on the access stratum configuration of the second link, the second relay terminal forwards the first service to the second terminal on the access stratum configuration of the third link.

Step 1117 is similar to step 916, and step 1118 is similar to step 917. Details are not described herein again.

It should be noted that a sequence of the steps is not limited in this embodiment of this application. For example, for step 1115 and step 1106, step 1115 may be performed before step 1106, or step 1106 may be performed before step 1115, or step 1115 and step 1106 may be simultaneously performed.

Figure 12B:
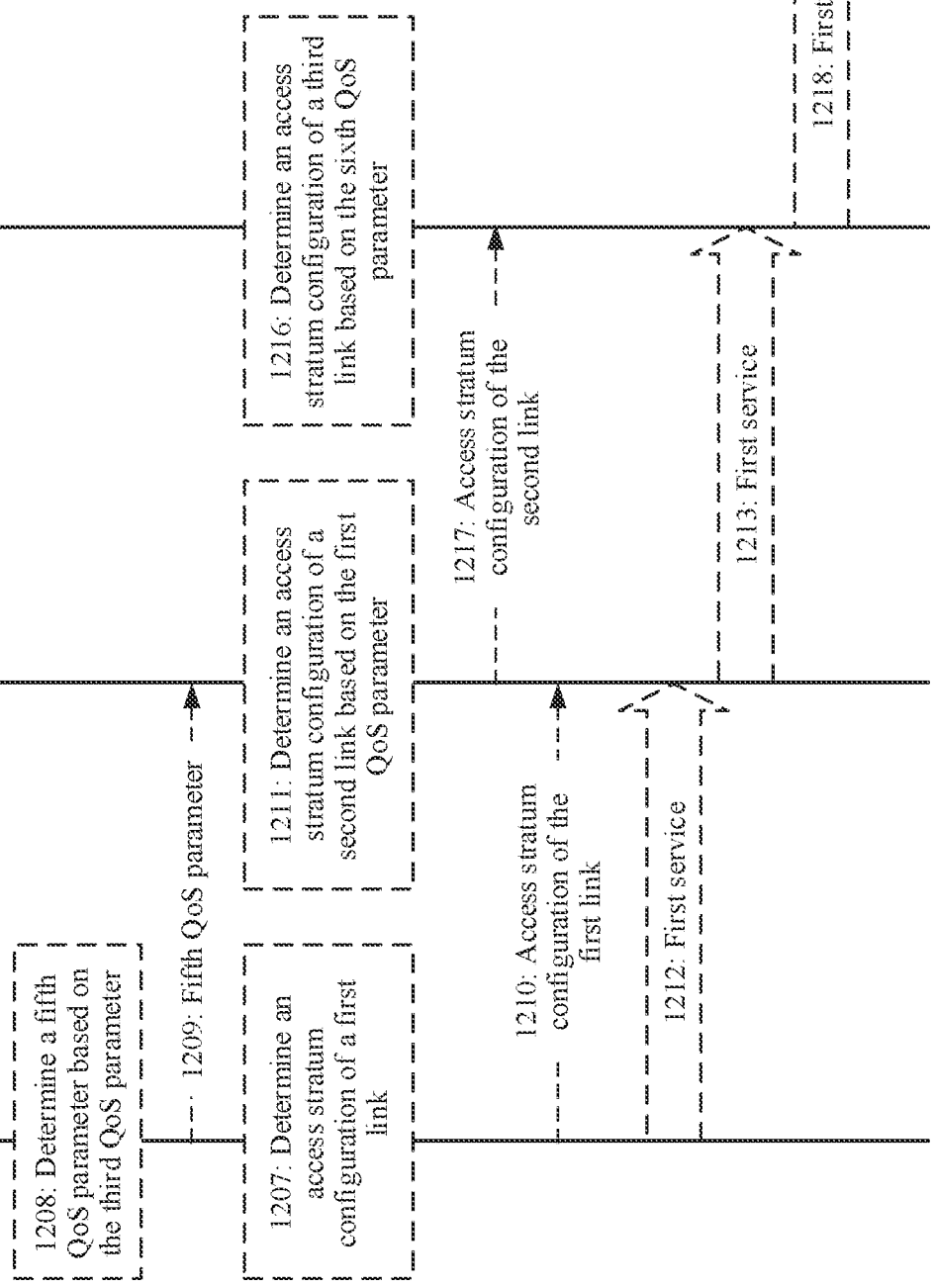

FIG. 12A and FIG. 12B are a schematic flowchart of another communication method according to this application. The method shown in FIG. 12A and FIG. 12B corresponds to the foregoing manner C. In FIG. 11A and FIG. 11B, the first QoS parameter corresponds to the second link and the third link, and the first relay terminal needs to determine the fourth QoS parameter and the sixth QoS parameter based on the first QoS parameter, and send the sixth QoS parameter to the second relay terminal. Different from FIG. 11A and FIG. 11B, in FIG. 12A and FIG. 12B, the first QoS parameter corresponds to the second link, and the first relay terminal determines a sixth QoS parameter based on the received second QoS parameter, and sends the sixth QoS parameter to the second relay terminal. For descriptions of other steps, refer to FIG. 11A and FIG. 11B. Details are not described herein again.

It should be noted that when the first terminal and the second terminal may communicate with each other through different paths, for the different paths, the first terminal may separately perform QoS management by using the method described in FIG. 9A and FIG. 9B, FIG. 10A and FIG. 10B, FIG. 11A and FIG. 11B, or FIG. 12A and FIG. 12B. For example, the first terminal and the second terminal may communicate with each other through a first path and a second path, where the first path is a path through which the first terminal is connected to the second terminal by the first relay terminal, and the second path is a path through which the first terminal is connected to the second terminal by the first relay terminal and the second relay terminal. The first terminal may separately perform QoS management through the first path and the second path.

(3) The access network device determines an access stratum configuration of each link.

In a possible implementation, when there are a plurality of relay terminals between the first terminal and the second terminal, the first information may include information about a link used by each relay terminal to forward the first service, and the second information may also include the information about the link used by each relay terminal to forward the first service. In this case, the access network device may determine an access stratum configuration corresponding to each link, and deliver the access stratum configuration.

For example, when the first relay terminal and the second relay terminal are included between the first terminal and the second terminal, the first information and the second information may further include information about a third link, where the third link is a link between the second relay terminal and the second terminal. In this case, the access network device may determine access stratum configurations of the first link, the second link, and the third link, and deliver the access stratum configurations of the first link, the second link, and the third link to the first terminal, and the first terminal then forwards the access stratum configurations of the first link, the second link, and the third link to the first relay terminal and the second relay terminal.

In another possible implementation, when there are a plurality of relay terminals between the first terminal and the second terminal, the first information may include information about each relay terminal and information about a link used by each relay terminal to forward the first service, and the second information may also include the information about each relay terminal and the information about the link used by each relay terminal to forward the first service. In this case, the access network device may determine an access stratum configuration corresponding to the link used by each relay terminal to forward the first service, and deliver the access stratum configuration corresponding to the link.

For example, when the first relay terminal and the second relay terminal are included between the first terminal and the second terminal, the first information and the second information may further include information about the second relay terminal and information about a third link, where the third link is a link between the second relay terminal and the second terminal. In this case, the access network device may determine access stratum configurations of the first link, the second link, and the third link, and deliver the access stratum configurations of the first link, the second link, and the third link to the first terminal, the first relay terminal, and the second relay terminal.

It should be understood that in the foregoing embodiments, the terminal, the relay terminal, and the access network device may perform some or all of the steps in embodiments. These steps or operations are merely examples. Other operations or variations of various operations may further be performed in embodiments of this application. In addition, the steps may be performed in a sequence different from a sequence presented in embodiments, and not all operations in embodiments of this application may be necessarily to be performed. In addition, sequence numbers of the steps do not indicate an execution sequence. An execution sequence of the processes should be determined based on functions and internal logic of the processes, and should not constitute any limitation on the implementation processes of embodiments of this application.

The communication methods provided in embodiments of this application are described above in detail with reference to FIG. 6 to FIG. 12A and FIG. 12B. Communication apparatuses provided in embodiments of this application are described in detail below with reference to FIG. 13 and FIG. 14.

Figure 13:
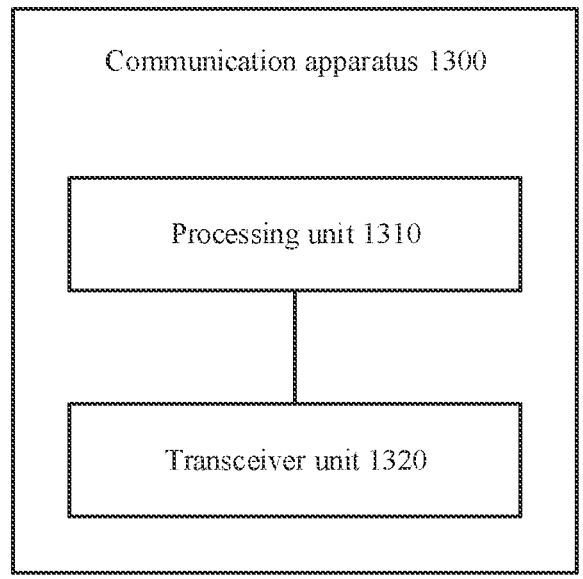
FIG. 13 is a schematic block diagram of a communication apparatus according to an embodiment of this application.

FIG. 13 is a schematic block diagram of a communication apparatus according to an embodiment of this application.

As shown in FIG. 13, the communication apparatus 1300 may include a processing unit 1310 and a transceiver unit 1320.

Optionally, the communication apparatus 1300 may correspond to the first terminal, the first relay terminal, the second relay terminal, or the access network device in the foregoing method embodiments, for example, may be the first terminal, the first relay terminal, the second relay terminal, or the access network device, or a component (such as a circuit, a chip, or a chip system) configured in the first terminal, the first relay terminal, the second relay terminal, or the access network device.

It should be understood that the communication apparatus 1300 may include units configured to perform the methods performed by the first terminal, the first relay terminal, the second relay terminal, or the access network device in the methods shown in FIG. 6 to FIG. 12A and FIG. 12B. In addition, the units in the communication apparatus 1300 and the foregoing other operations and/or functions are separately intended to implement corresponding procedures of the methods shown in FIG. 6 to FIG. 12A and FIG. 12B. The processing unit may be configured to perform steps other than receiving and sending steps, and the transceiver unit performs the receiving and sending steps.

For example, when the communication apparatus 1300 is configured to perform steps performed by the first terminal in FIG. 6, the processing unit 1310 may be configured to perform steps 601 to 603 and 608, and the transceiver unit 1320 may be configured to perform steps 604, 607, 609, and 610. When the communication apparatus 1300 is configured to perform steps performed by the first terminal in FIG. 7, the processing unit 1310 may be configured to perform steps 701, 702, 707, and 708, and the transceiver unit 1320 may be configured to perform steps 703, 706, 709, 710, and 712. When the communication apparatus 1300 is configured to perform steps performed by the first terminal in FIG. 8, the processing unit 1310 may be configured to perform steps 801 and 802, and the transceiver unit 1320 may be configured to perform steps 803, 804, 806, 808 to 811, and 813. When the communication apparatus 1300 is configured to perform steps performed by the first terminal in FIG. 9A and FIG. 9B, the processing unit 1310 may be configured to perform steps 901 to 903, 908, and 912, and the transceiver unit 1320 may be configured to perform steps 904, 913, 907, 909, and 910. When the communication apparatus 1300 is configured to perform steps performed by the first terminal in FIG. 10A and FIG. 10B, the processing unit 1310 may be configured to perform steps 1001 to 1003, and 1008, and the transceiver unit 1320 may be configured to perform steps 1004, 1007, 1009, and 1010. When the communication apparatus 1300 is configured to perform steps performed by the first terminal in FIG. 11A and FIG. 11B, the processing unit 1310 may be configured to perform steps 1101, 1102, 1108, and 1107, and the transceiver unit 1320 may be configured to perform steps 1103, 1106, 1109, 1110, and 1112. When the communication apparatus 1300 is configured to perform steps performed by the first terminal in FIG. 12A and FIG. 12B, the processing unit 1310 may be configured to perform steps 1201, 1202, 1208, and 1207, and the transceiver unit 1320 may be configured to perform steps 1203, 1206, 1209, 1210, and 1212.

When the communication apparatus 1300 is configured to perform steps performed by the first relay terminal in FIG. 6, the processing unit 1310 may be configured to perform steps 605 and 606, and the transceiver unit 1320 may be configured to perform steps 604, 607, 609, 610, and 611. When the communication apparatus 1300 is configured to perform steps performed by the first relay terminal in FIG. 7, the processing unit 1310 may be configured to perform steps 705, 704, and 711, and the transceiver unit 1320 may be configured to perform steps 703, 706, 709, 710, 712, and 713. When the communication apparatus 1300 is configured to perform steps performed by the first relay terminal in FIG. 8, the transceiver unit 1320 may be configured to perform steps 803, 807.809, 811, 812, 813, and 814. When the communication apparatus 1300 is configured to perform steps performed by the first relay terminal in FIG. 9A and FIG. 9B, the processing unit 1310 may be configured to perform steps 906 and 905, and the transceiver unit 1320 may be configured to perform steps 904, 913, 907, 909, 916, 910, and 911. When the communication apparatus 1300 is configured to perform steps performed by the first relay terminal in FIG. 10A and FIG. 10B, the processing unit 1310 may be configured to perform steps 1006, 1012, and 1005, and the transceiver unit 1320 may be configured to perform steps 1004, 1007, 1013, 1009, 1015, 1010, and 1011. When the communication apparatus 1300 is configured to perform steps performed by the first relay terminal in FIG. 11A and FIG. 11B, the processing unit 1310 may be configured to perform steps 1104, 1105, 1114, and 1111, and the transceiver unit 1320 may be configured to perform steps 1103, 1106, 1115, 1109, 1110, 1117, 1112, and 1113. When the communication apparatus 1300 is configured to perform steps performed by the first relay terminal in FIG. 12A and FIG. 12B, the processing unit 1310 may be configured to perform steps 1204, 1205, 1214, and 1211, and the transceiver unit 1320 may be configured to perform steps 1203, 1206, 1215, 1209, 1210, 1217, 1212, and 1213.

When the communication apparatus 1300 is configured to perform steps performed by the second relay terminal in FIG. 9A and FIG. 9B, the processing unit 1310 may be configured to perform step 915, and the transceiver unit 1320 may be configured to perform steps 914, 916, 911, and 917. When the communication apparatus 1300 is configured to perform steps performed by the second relay terminal in FIG. 10A and FIG. 10B, the processing unit 1310 may be configured to perform step 1014, and the transceiver unit 1320 may be configured to perform steps 1013, 1015, 1011, and 1016. When the communication apparatus 1300 is configured to perform steps performed by the first relay terminal in FIG. 11A and FIG. 11B, the processing unit 1310 may be configured to perform step 1116, and the transceiver unit 1320 may be configured to perform steps 1115, 1117, 1113, and 1118. When the communication apparatus 1300 is configured to perform steps performed by the first relay terminal in FIG. 12A and FIG. 12B, the processing unit 1310 may be configured to perform step 1216, and the transceiver unit 1320 may be configured to perform steps 1215, 1217, 1213, and 1218.

When the communication apparatus 1300 is configured to perform steps performed by the access network device in FIG. 8, the processing unit 1310 may be configured to perform step 805, and the transceiver unit 1320 may be configured to perform steps 804, 806 to 808, 810, 812, and 814.

It should be further understood that when the communication apparatus 1300 is the first terminal, the first relay terminal, the second relay terminal, or the access network device, the transceiver unit 1320 in the communication apparatus 1300 may be implemented by using a transceiver, and the processing unit 1310 may be implemented by using at least one processor.

It should be further understood that when the communication apparatus 1300 is a chip or a chip system configured in the first terminal, the first relay terminal, the second relay terminal, or the access network device, the transceiver unit 1320 in the communication apparatus 1300 may be implemented through an input/output interface, a circuit, or the like, and the processing unit 1310 may be implemented by using a processor, a microprocessor, an integrated circuit, or the like that is integrated into the chip or the chip system.

It should be understood that a specific process in which the units perform the foregoing corresponding steps is described in detail in the foregoing method embodiments. For brevity, details are not described herein again.

Figure 14:
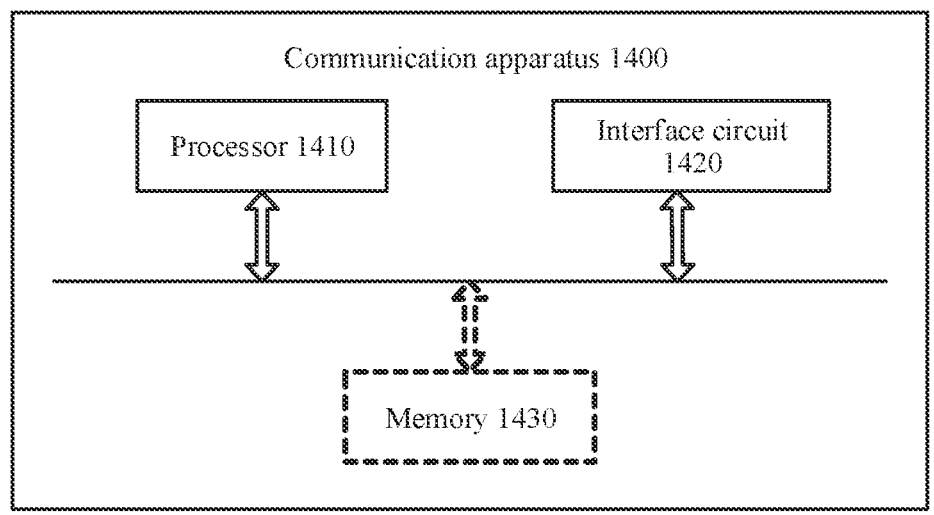
FIG. 14 is another schematic block diagram of a communication apparatus according to an embodiment of this application.

FIG. 14 is another schematic block diagram of a communication apparatus according to an embodiment of this application. As shown in FIG. 14, the communication apparatus 1400 includes a processor 1410 and an interface circuit 1420. The processor 1410 and the interface circuit 1420 are coupled to each other. It may be understood that the interface circuit 1420 may be a transceiver or an input/output interface. Optionally, the communication apparatus 1400 may further include a memory 1430, configured to store instructions to be executed by the processor 1410, store input data required for running instructions by the processor 1410, or store data generated after the processor 1410 runs instructions.

When the communication apparatus 1400 is configured to implement the methods shown in FIG. 6 to FIG. 12A and FIG. 12B, the processor 1410 is configured to perform a function of the processing unit 1310, and the interface circuit 1420 is configured to perform a function of the transceiver unit 1320.

It should be noted that the processor in this embodiment of this application may be a central processing unit (Central Processing Unit, CPU), another general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a transistor logic device, a hardware component, or any combination thereof. The general-purpose processor may be a microprocessor or any conventional processor or the like.

The method steps in embodiments of this application may be implemented in a hardware manner, or may be implemented in a manner of executing software instructions by the processor. The software instructions may include a corresponding software module. The software module may be stored in a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in a first node, a donor node, or a first parent node. Certainly, the processor and the storage medium may alternatively exist in the first node, the donor node, or the first parent node as discrete components.

All or some of the foregoing embodiments may be implemented by software, hardware, firmware, or any combination thereof. When software is used to implement embodiments, all or some of embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted by using a computer-readable storage medium. The computer-readable storage medium may be any usable medium accessible by the computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state disk (solid-state disk, SSD).

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" usually indicates an "or" relationship between associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the apparatus embodiments described above are merely examples. For example, division into the units is merely logical function division, and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the methods described in embodiments of this application. The foregoing storage medium includes any medium that can store program code, such as a USB flash drive, a removable hard disk, a read-only memory (read-only memory, ROM), a random access memory (random access memory. RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
   obtaining, by a first communication apparatus, a first service that is to be sent from the first communication apparatus to a second communication apparatus;
   determining, by the first communication apparatus, a first quality of service (QOS) parameter based on the first service, wherein the first QoS parameter indicates a QoS requirement for sending the first service from the first communication apparatus to the second communication apparatus;
   sending, by the first communication apparatus, the first QoS parameter to a first relay communication apparatus, wherein the first relay communication apparatus is a relay communication apparatus between the first communication apparatus and the second communication apparatus; and
   receiving, by the first communication apparatus, a second QOS parameter from the first relay communication apparatus, wherein the second QoS parameter is used to determine a QoS parameter corresponding to the first service on a first link, and the first link is a link between the first communication apparatus and the first relay communication apparatus.

2. The method according to claim 1, wherein the method further comprises:
   determining, by the first communication apparatus, an access stratum configuration of the first link based on the second QoS parameter;
   sending, by the first communication apparatus, the access stratum configuration of the first link to the first relay communication apparatus; and
   sending, by the first communication apparatus, the first service to the first relay communication apparatus based on the access stratum configuration of the first link.

3. The method according to claim 2, wherein the determining, by the first communication apparatus, an access stratum configuration of the first link based on the second QoS parameter comprises:
   determining, by the first communication apparatus, a third QoS parameter based on the second QOS parameter, wherein the third QoS parameter is a QoS parameter corresponding to the first service on the first link; and
   determining, by the first communication apparatus, the access stratum configuration of the first link based on the third QoS parameter.

4. The method according to claim 3, wherein the method further comprises:
   sending, by the first communication apparatus, the third QoS parameter to the first relay communication apparatus.

5. A communication method, wherein the method comprises:
   receiving, by a first relay communication apparatus, a second quality of service (QOS) parameter from a first communication apparatus, wherein the second QoS parameter indicates a QOS requirement for sending a first service from the first communication apparatus to a second communication apparatus, and the first relay communication apparatus is a relay communication apparatus between the first communication apparatus and the second communication apparatus;
   determining, by the first relay communication apparatus, a first QoS parameter based on the second QoS parameter, wherein the first QoS parameter corresponds to a link comprised between the first relay communication apparatus and the second communication apparatus;
   determining, by the first relay communication apparatus, a third QoS parameter based on the second QoS parameter, wherein the third QoS parameter is used to determine a QoS parameter corresponding to the first service on a first link, and the first link is a link between the first communication apparatus and the first relay communication apparatus; and
   sending, by the first relay communication apparatus, the third QoS parameter to the first communication apparatus.

6. The method according to claim 5, wherein the method further comprises:
   determining, by the first relay communication apparatus, an access stratum configuration of a second link based on the first QoS parameter, wherein the second link is a link between the first relay communication apparatus and the second communication apparatus or a link between the first relay communication apparatus and a second relay communication apparatus, and the second relay communication apparatus is a relay communication apparatus between the first relay communication apparatus and the second communication apparatus;

receiving, by the first relay communication apparatus, an access stratum configuration of a first link from the first communication apparatus, wherein the access stratum configuration of the first link corresponds to the access stratum configuration of the second link; and receiving, by the first relay communication apparatus, the first service from the first communication apparatus based on the access stratum configuration of the first link, and forwarding the first service based on the access stratum configuration of the second link.

7. The method according to claim 6, wherein the determining, by the first relay communication apparatus, an access stratum configuration of a second link based on the first QoS parameter comprises:

receiving, by the first relay communication apparatus, a fifth QoS parameter from the first communication apparatus, wherein the fifth QoS parameter is a QoS parameter corresponding to the first service on the first link;

determining, by the first relay communication apparatus, a fourth QoS parameter based on the first QoS parameter and the fifth QoS parameter, wherein the fourth QOS parameter is a QoS parameter corresponding to the first service on the second link; and determining, by the first relay communication apparatus, the access stratum configuration of the second link based on the fourth QoS parameter.

8. The method according to claim 5, wherein the determining, by the first relay communication apparatus, a first QOS parameter based on the second QoS parameter comprises:

determining, by the first relay communication apparatus, the first QoS parameter based on the second QoS parameter and link information, wherein the link information indicates a link through which the first communication apparatus sends the first service to the second communication apparatus.

9. The method according to claim 5, wherein the method further comprises:

determining, by the first relay communication apparatus, another QoS parameter based on the second QoS parameter, wherein the another QoS parameter is used to determine a QoS parameter corresponding to the first service on a third link, the third link is a link between a second relay communication apparatus and the second communication apparatus or a link between the second relay communication apparatus and a third relay communication apparatus, the second relay communication apparatus is a relay communication apparatus between the first relay communication apparatus and the second communication apparatus, and the third relay communication apparatus is a relay communication apparatus between the second relay communication apparatus and the second communication apparatus; and sending, by the first relay communication apparatus, the another QoS parameter to the second relay communication apparatus.

10. A first communication apparatus, wherein the first communication apparatus comprises:
a transceiver;
at least one processor; and
one or more memories coupled to the at least one processor and storing programming instructions for execution by the at least one processor to cause the first communication apparatus to:

obtain a first service that is to be sent from the first communication apparatus to a second communication apparatus determine a first quality of service (QOS) parameter based on the first service, wherein the first QoS parameter indicates a QoS requirement for sending the first service from the first communication apparatus to the second communication apparatus;

send, by using the transceiver, the first QoS parameter to a first relay communication apparatus, wherein the first relay communication apparatus is a relay communication apparatus between the first communication apparatus and the second communication apparatus; and receive, by using the transceiver, a second QOS parameter from the first relay communication apparatus, wherein the second QoS parameter is used to determine a QoS parameter corresponding to the first service on a first link, and the first link is a link between the first communication apparatus and the first relay communication apparatus.

11. The first communication apparatus according to claim 10, wherein the programming instructions, when executed by the at least one processor, cause the first communication apparatus to:

determine an access stratum configuration of the first link based on the second QoS parameter;

send, by using the transceiver, the access stratum configuration of the first link to the first relay communication apparatus; and send, by using the transceiver, the first service to the first relay communication apparatus based on the access stratum configuration of the first link.

12. The first communication apparatus according to claim 11, wherein the programming instructions, when executed by the at least one processor, cause the first communication apparatus to:

determine a third QoS parameter based on the second QoS parameter, wherein the third QoS parameter is a QoS parameter corresponding to the first service on the first link; and determine the access stratum configuration of the first link based on the third QoS parameter.

13. The first communication apparatus according to claim 12, wherein the programming instructions, when executed by the at least one processor, cause the first communication apparatus to:

send, by using the transceiver, the third QoS parameter to the first relay communication apparatus.

14. A communication apparatus, wherein the communication apparatus comprises:
a transceiver;
at least one processor; and
one or more memories coupled to the at least one processor and storing programming instructions for execution by the at least one processor to cause the communication apparatus to:

receive, by using the transceiver, a second quality of service (QOS) parameter from a first communication apparatus, wherein the second QoS parameter indicates a QoS requirement for sending a first service from the first communication apparatus to a second communication apparatus, and the communication apparatus is a relay communication apparatus between the first communication apparatus and the second communication apparatus;

determine a first QoS parameter based on the second QoS parameter, wherein the first QoS parameter corresponds to a link comprised between the communication apparatus and the second communication apparatus;

determine a third QoS parameter based on the second QoS parameter, wherein the third Qos parameter is used to determine a QoS parameter corresponding to the first service on a first link, and the first link is a link between the first communication apparatus and the communication apparatus; and send, by using the transceiver, the third QoS parameter to the first communication apparatus.

15. The communication apparatus according to claim 14, wherein the programming instructions, when executed by the at least one processor, cause the communication apparatus to:

determine an access stratum configuration of a second link based on the first QoS parameter, wherein the second link is a link between the communication apparatus and the second communication apparatus or a link between the communication apparatus and a second relay communication apparatus, and the second relay communication apparatus is a relay communication apparatus between the communication apparatus and the second communication apparatus;

receive, by using the transceiver, an access stratum configuration of a first link from the first communication apparatus, wherein the access stratum configuration of the first link corresponds to the access stratum configuration of the second link; and receive, by using the transceiver, the first service from the first communication apparatus based on the access stratum configuration of the first link, and forward, by using the transceiver, the first service based on the access stratum configuration of the second link.

16. The communication apparatus according to claim 15, wherein the programming instructions, when executed by the at least one processor, cause the communication apparatus to:

receive, by using the transceiver, a fifth QoS parameter from the first communication apparatus, wherein the fifth QOS parameter is a QoS parameter corresponding to the first service on the first link; and determine a fourth QoS parameter based on the first QoS parameter and the fifth QoS parameter, wherein the fourth QoS parameter is a QoS parameter corresponding to the first service on the second link; and determine the access stratum configuration of the second link based on the fourth QoS parameter.

17. The communication apparatus according to claim 14, wherein the programming instructions, when executed by the at least one processor, cause the communication apparatus to:

determine the first QoS parameter based on the second QoS parameter and link information, wherein the link information indicates a link through which the first communication apparatus sends the first service to the second communication apparatus.

18. The communication apparatus according to claim 14, wherein the programming instructions, when executed by the at least one processor, cause the communication apparatus to:

determine another QoS parameter based on the second QoS parameter, wherein the another QoS parameter is used to determine a QoS parameter corresponding to the first service on a third link, the third link is a link between a second relay communication apparatus and the second communication apparatus or a link between the second relay communication apparatus and a third relay communication apparatus, the second relay communication apparatus is a relay communication apparatus between the communication apparatus and the second communication apparatus, and the third relay communication apparatus is a relay communication apparatus between the second relay communication apparatus and the second communication apparatus; and send, by using the transceiver, the another QoS parameter to the second relay communication apparatus.

* * * * *